US012643507B2

(12) United States Patent
Shigematsu et al.

(10) Patent No.: US 12,643,507 B2
(45) Date of Patent: Jun. 2, 2026

(54) PEDAL DEVICE

(71) Applicant: DENSO CORPORATION, Kariya-city (JP)

(72) Inventors: Makoto Shigematsu, Kariya-city (JP); Yuki Matsunaga, Kariya-city (JP)

(73) Assignee: DENSO CORPORATION, Kariya-city (JP)

(*) Notice: Subject to any disclaimer, the term of this patent is extended or adjusted under 35 U.S.C. 154(b) by 0 days.

(21) Appl. No.: 19/028,448

(22) Filed: Jan. 17, 2025

(65) Prior Publication Data

US 2025/0162548 A1 May 22, 2025

Related U.S. Application Data

(63) Continuation of application No. PCT/JP2023/031252, filed on Aug. 29, 2023.

(30) Foreign Application Priority Data

Sep. 7, 2022 (JP) ................................. 2022-142528

(51) Int. Cl.
    B60T 7/06 (2006.01)
(52) U.S. Cl.
    CPC ..................................... B60T 7/06 (2013.01)
(58) Field of Classification Search
    None
    See application file for complete search history.

(56) References Cited

U.S. PATENT DOCUMENTS

| | | | | |
|---|---|---|---|---|
| 6,471,304 B1 * | 10/2002 | Deml | ................... | B60T 8/3255 |
| | | | | 303/114.1 |
| 9,079,570 B2 | 7/2015 | Sellinger et al. | | |
| 2021/0237569 A1 | 8/2021 | Ridder et al. | | |

FOREIGN PATENT DOCUMENTS

JP 2013014250 A * 1/2013

* cited by examiner

*Primary Examiner* — Vicky A Johnson
(74) *Attorney, Agent, or Firm* — Nixon & Vanderhye P.C.

(57) ABSTRACT

A pedal device includes: a pedal rotating about a rotation shaft when being stepped by an operator; an elastic member of a reaction force generating mechanism generating a reaction force against a pedaling force of the operator by deformation due to a force from the pedal when the pedal rotates; a housing rotatably supporting the pedal and defining a housing space that houses the elastic member; and a support member supporting the elastic member. The housing includes an opening portion that defines an opening space opening in one direction, the opening space communicates with the housing space, and the support member and the housing are connected to each other to surround the elastic member while the opening space is closed by the support member. With this, the elastic member is arranged in the housing space.

14 Claims, 31 Drawing Sheets

FIG. 14

UP
Da
FRONT ←→ REAR
Db        Dc
DOWN

PEDAL DEVICE

CROSS REFERENCE TO RELATED APPLICATION

The present application is a continuation application of International Patent Application No. PCT/JP2023/031252 filed Aug. 29, 2023, which designated the U.S. and claims the benefit of priority from Japanese Patent Application No. 2022-142528 filed on Sep. 7, 2022. The entire disclosures of all of the above applications are incorporated herein by reference.

TECHNICAL FIELD

The present disclosure relates to a pedal device.

BACKGROUND

A brake-by-wire type brake system is known that includes a pedal device having a brake pedal, a pedal housing, and a pedal simulator. In such pedal device, the brake pedal is attached to the pedal housing. The pedal simulator is attached to an outside of the pedal housing. Further, the pedal simulator includes a spring as an elastic member and a spring housing. The spring generates a reaction force by elastically deforming when the brake pedal is pedaled. The spring housing supports the spring, and a part of the spring is exposed to the outside of the spring housing.

SUMMARY

According to one aspect of the present disclosure, a pedal device includes: a pedal rotating about a rotation shaft when being stepped on by an operator; an elastic member configured to be deformed by a force from the pedal when the pedal rotates, and to generate a reaction force against a pedaling force of the operator; a housing defining a housing space that houses the elastic member, and provided to rotatably support the pedal; and a support member configured to support the elastic member. The housing includes an opening portion that defines an opening space opening in one direction, and the opening space of the housing communicates with the housing space. In addition, the support member and the housing are connected to each other to surround the elastic member while the opening space of the housing is closed by the support member. With this, the elastic member can be easily arranged in the housing space.

BRIEF DESCRIPTION OF THE DRAWINGS

Objects, features, and advantages of the present disclosure will become more apparent from the following detailed description made with reference to the accompanying drawings, in which:

FIG. 14 is a cross-sectional view of a pedal device according to a fifth embodiment;

DETAILED DESCRIPTION

Figure 1:
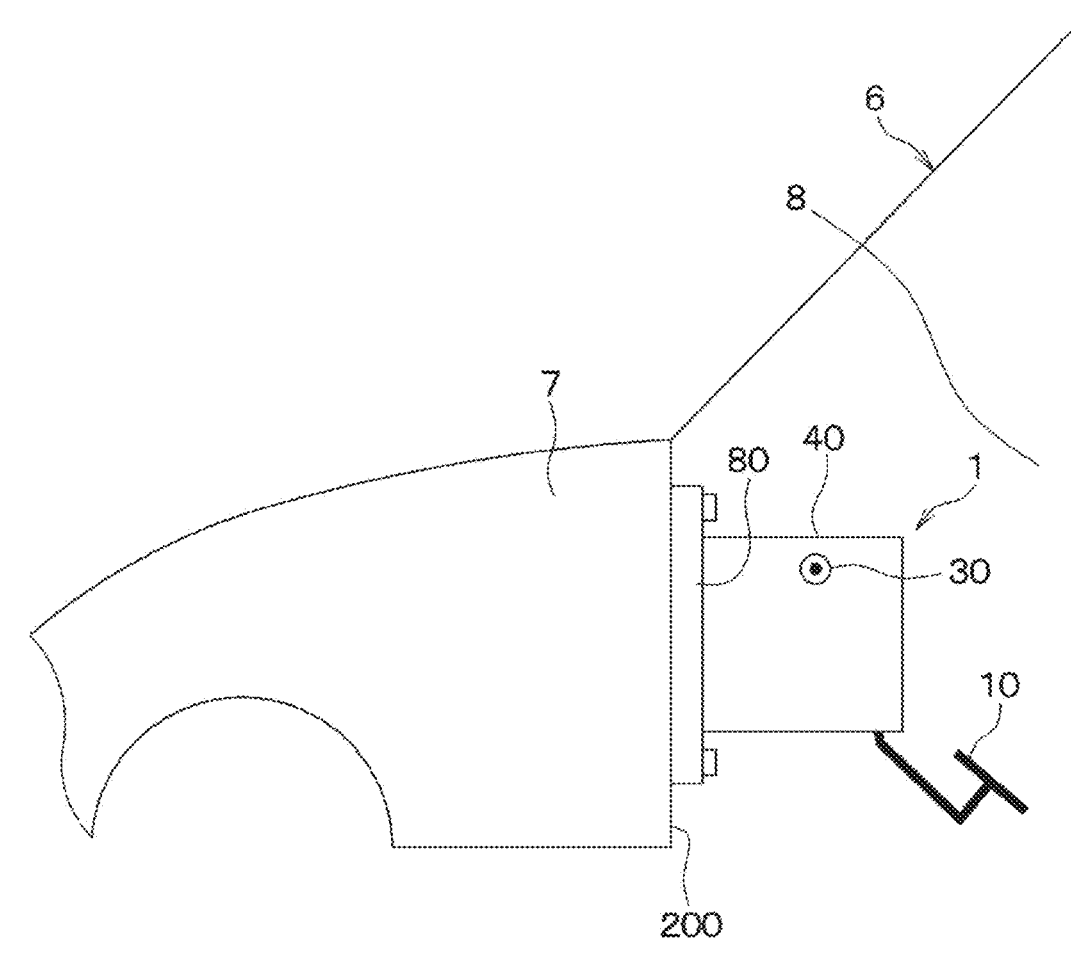
FIG. 1 is a diagram showing a pedal device according to a first embodiment when installed in a vehicle.
Figure 1:
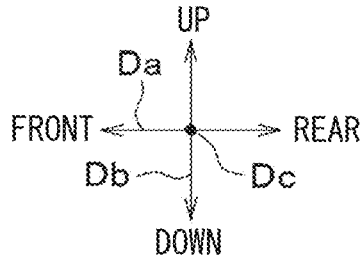

The inventors studied a pedal device in which a spring housing is attached to an outside of a pedal housing, and a part of a spring is exposed to an outside of the spring housing. In the pedal device, because the spring is exposed to the outside of the pedal device, foreign matter such as dust, water and the like may easily enter into the spring from the outside the pedal device. Therefore, deformation of the spring may be easily caused.

It is an object of the present disclosure to provide a pedal device that effectively suppresses foreign matter from entering into an elastic member.

According to an exemplar of the present disclosure, a pedal device includes: a pedal rotating about a rotation shaft when being stepped on by an operator; an elastic member configured to be deformed by a force from the pedal when the pedal rotates, and to generate a reaction force against a pedaling force of the operator; a housing defining a housing space that houses the elastic member, and provided to rotatably support the pedal; and a support member configured to support the elastic member. The housing includes an opening portion that defines an opening space opening in one direction, and the opening space of the housing communicates with the housing space. In addition, the support member and the housing are connected to each other to surround the elastic member while the opening space of the housing is closed by the support member.

In such manner, the elastic member can be arranged in the housing space, and the elastic member can be prevented from being exposed to the outside of the pedal device, thereby the housing and the support member prevent foreign matter from entering into the elastic member from the outside of the pedal device. Therefore, it is possible to effectively restrict foreign matter from entering into the elastic member.

Hereinafter, an embodiment is described with reference to the drawings. In the following embodiments, the same or equivalent parts are denoted by the same reference numerals and the description thereof is omitted.

First Embodiment

A pedal device 1 of the present embodiment is used, for example, as a brake pedal in a brake-by-wire system 150 that controls brakes of a vehicle 6 shown in FIG. 1. First, the brake-by-wire system 150 is described.

Figure 2:
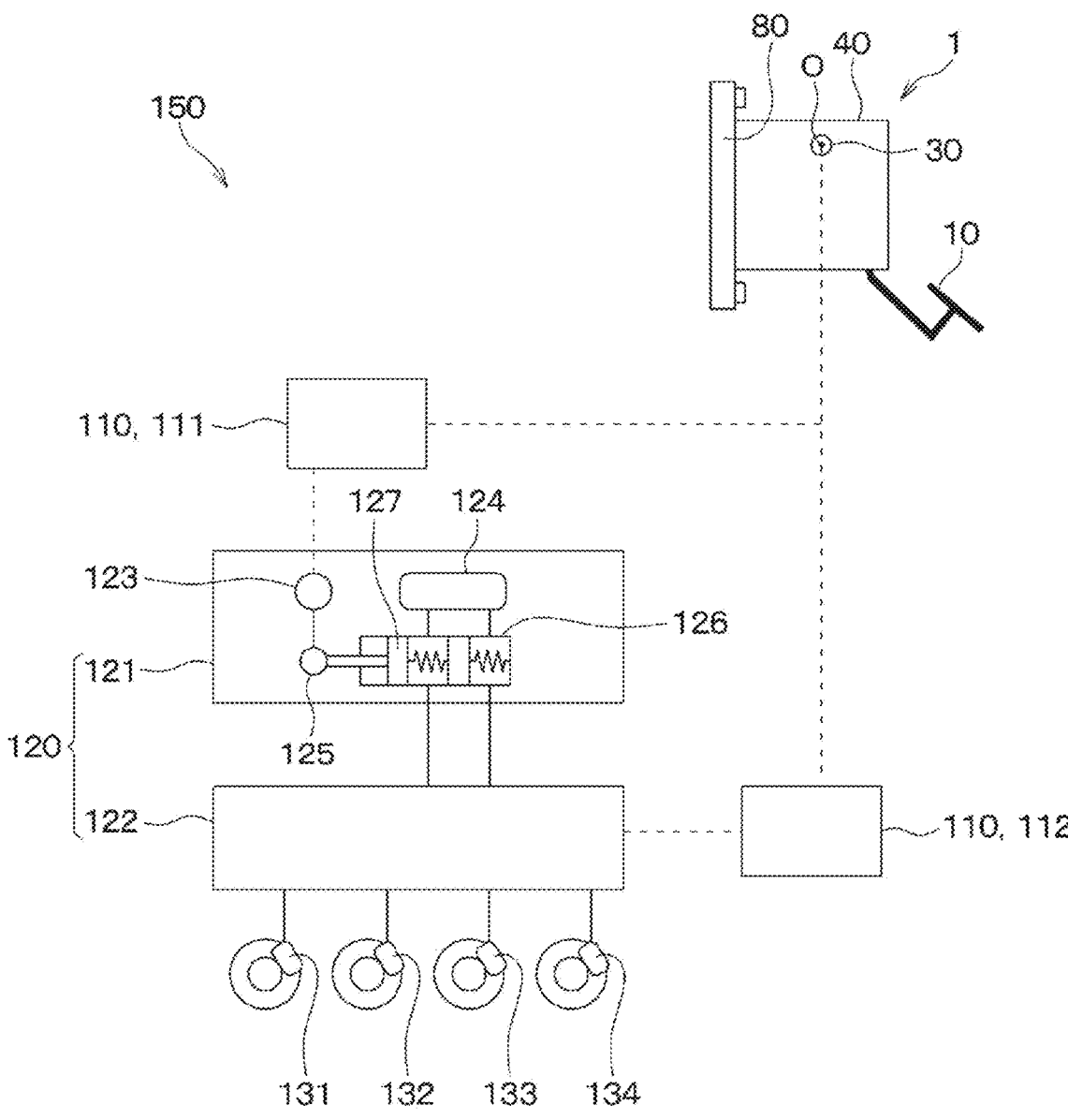
FIG. 2 is a configuration diagram of a brake-by-wire system in which the pedal device is used.

As shown in FIG. 2, the brake-by-wire system 150 includes a wheel cylinders 131 to 134, an ECU 110, a brake circuit 120, and a pedal device 1.

The wheel cylinders 131 to 134 are disposed on respective wheels of the vehicle 6. Further, brake pads (not shown) are attached to each of the wheel cylinders 131 to 134.

The ECU 110 includes a first ECU 111 and a second ECU 112. The first ECU 111 includes a microcomputer, a drive circuit, and the like, which are not shown. Further, the first ECU 111 controls a first brake circuit 121 of the brake circuit 120 (described later) based on a signal from the pedal device 1 (described later). The second ECU 112 includes a microcomputer, a drive circuit, and the like, which are not shown. Further, the second ECU 112 controls a second brake circuit 122 of the brake circuit 120 (described later) based on a signal from the pedal device 1 (described later).

The brake circuit 120 has the first brake circuit 121 and the second brake circuit 122. The first brake circuit 121 includes a reservoir 124, a motor 123, a gear mechanism 125 and a master cylinder 126. The reservoir 124 stores brake fluid. The motor 123 drives a gear mechanism 125. The gear mechanism 125 reciprocates a master piston 127 of the master cylinder 126 in an axial direction of the master cylinder 126. The second brake circuit 122 includes a solenoid valve and the like (not shown). The second brake circuit 122 controls hydraulic pressure in each of the wheel cylinders 131 to 134 by opening and closing the solenoid valve in response to control signals from the second ECU 112.

For the purpose of describing the pedal device 1 below, a front-rear direction of the vehicle 6 is defined as a vehicle front-rear direction Da as shown in FIG. 1. A top-bottom direction of the vehicle 6 is defined as a vehicle up-down direction Db. A left-vehicle right direction 6 is defined as a vehicle left-right direction Dc. A front in the vehicle front-rear direction Da is referred to as a vehicle front. A rear in the vehicle front-rear direction Da is referred to as a vehicle rear. An upper side in the vehicle up-down direction Db is referred to as a vehicle upper side. A lower side in the vehicle up-down direction Db is referred to as a vehicle lower side. A left side in the vehicle left-right direction Dc is referred to as a vehicle left side. A right side in the vehicle left-right direction Dc is referred to as a vehicle right side.

As shown in FIGS. 2 to 9, the pedal device 1 includes a pedal 10, a stroke sensor 30, a housing 40, a reaction force generating mechanism 60, and a support member 80.

The pedal 10 is operated by being pedaled by a driver of the vehicle 6. Specifically, the pedal 10 has a pedal portion 12, a lever portion 14, a lever protrusion 16, and a lever flange 18.

Figure 3:
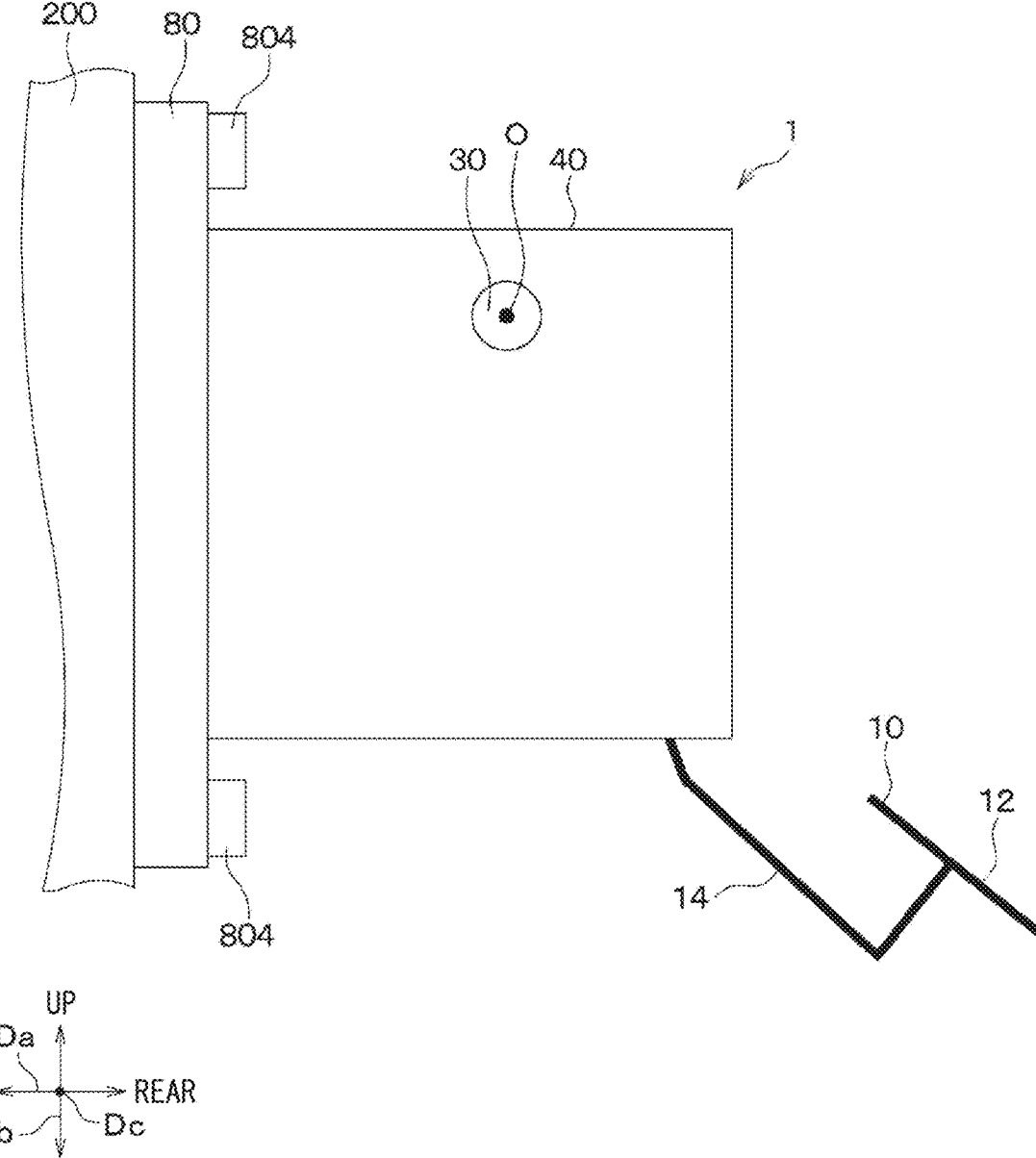
FIG. 3 is a side view of the pedal device.
Figure 4:
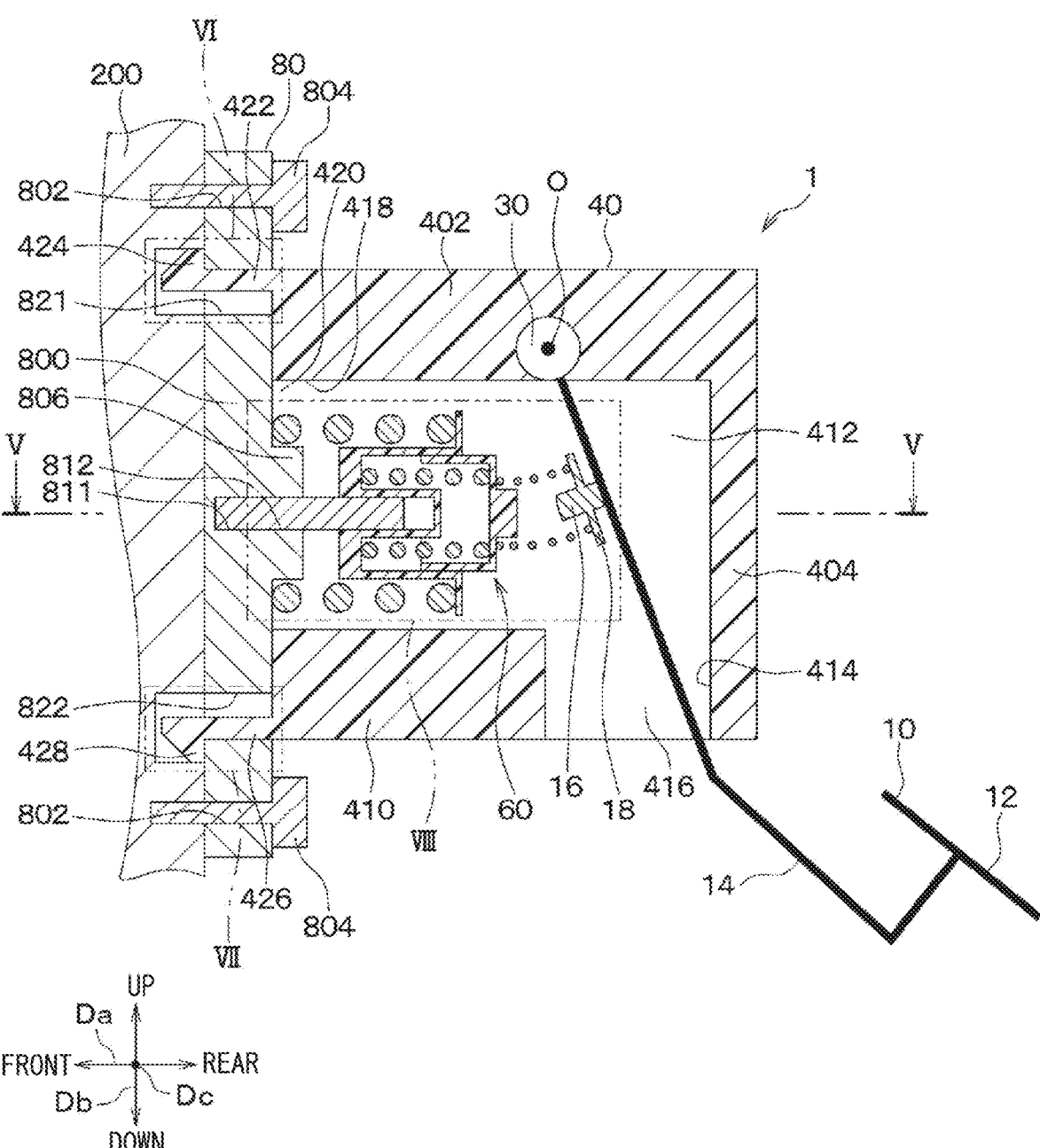
FIG. 4 is a cross-sectional view of the pedal device.
Figure 8:
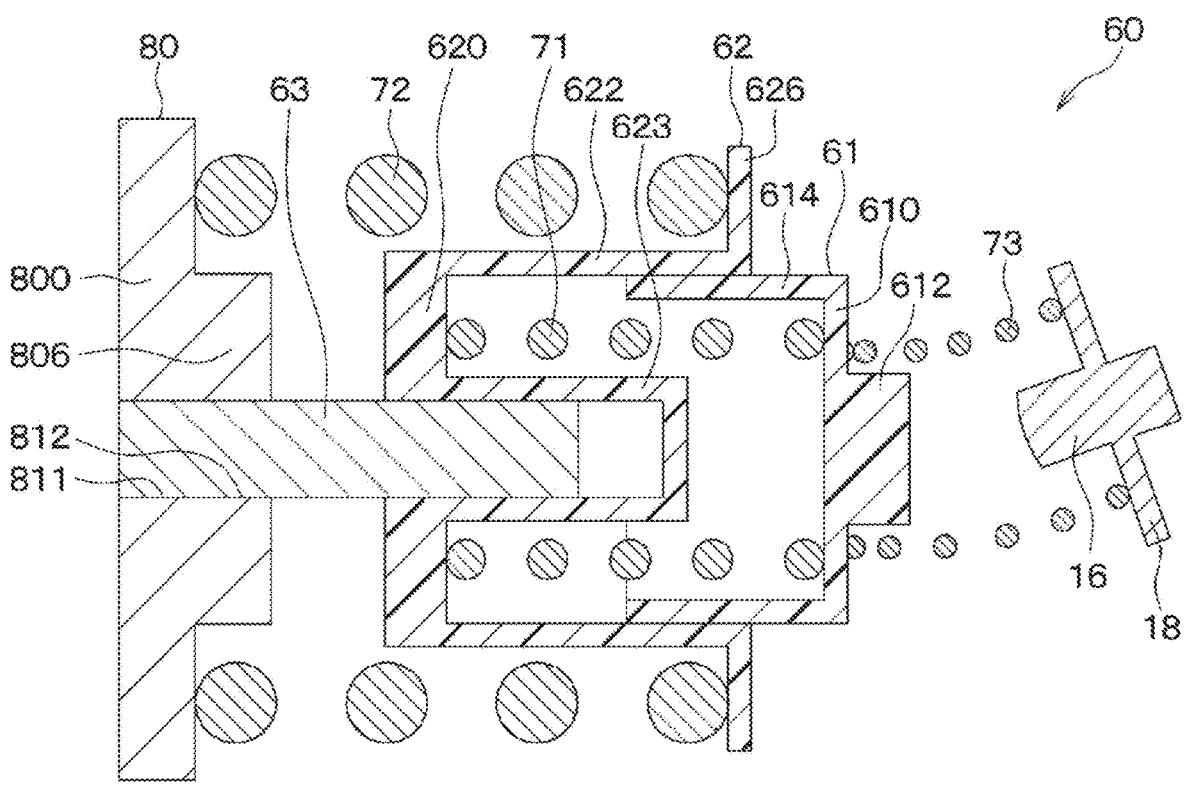
FIG. 8 is an enlarged view of a part VIII in FIG. 4.
Figure 8:
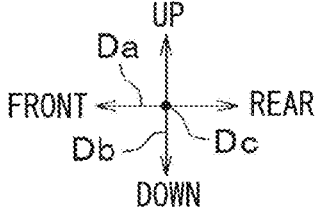
Figure 9:
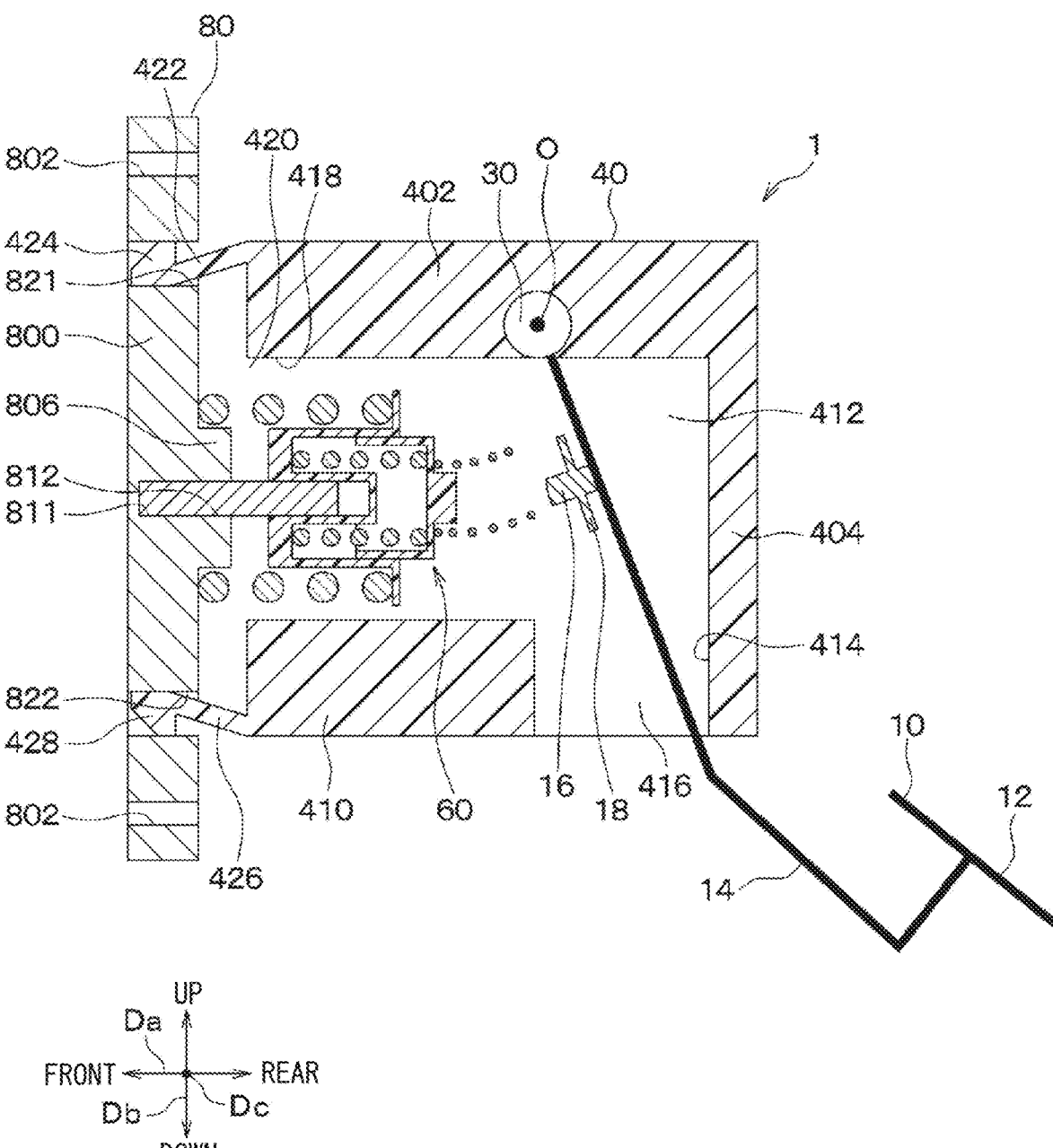
FIG. 9 is a cross-sectional view showing deformations of a first housing extension and a second housing extension of the pedal device.

The pedal portion 12 is pedaled by the driver, as shown in FIGS. 3, 4, and 9. The lever portion 14 is connected to the pedal portion 12. As shown in FIGS. 3 to 5 and 9, the lever portion 14 rotates about a rotation shaft O when the pedal portion 12 is pedaled by the driver. As shown in FIGS. 4, 5, 8 and 9, the lever protrusion 16 is connected to the lever portion 14 on the vehicle front side, and protrudes in a vehicle front direction from a boundary with the lever portion 14. The lever flange 18 is connected to the lever protrusion 16 and protrudes from a boundary with the lever protrusion 16 in a direction perpendicular to a protruding direction of the lever protrusion 16.

As shown in FIGS. 2 to 4 and 9, the stroke sensor 30 is disposed, for example, on the rotation shaft O of the lever portion 14. The stroke sensor 30 includes a magnet, a yoke, a Hall element, and the like. In such manner, the stroke sensor 30 detects a rotation angle of the lever portion 14, and thereby detects the rotation angle and stroke amount of the pedal 10. Further, the stroke sensor 30 outputs a signal corresponding to the detected rotation angle and stroke amount of the pedal 10 to the first ECU 111 and the second ECU 112. In addition, the stroke sensor 30 detects the rotation angle and stroke amount of the pedal 10 by having a Hall element, but is not limited to such configuration, and may detect the rotation angle and stroke amount of the pedal 10 by having an MR element or the like. MR stands for Magneto Resistive. The stroke amount is, for example, an amount of movement of the pedal portion 12 in the vehicle front-rear direction Da.

The housing 40 supports the pedal 10 so that the pedal 10 can rotate. Further, the housing 40 is formed in a cylindrical shape with a bottom, and houses a part of the lever portion 14, the stroke sensor 30, and the reaction force generating mechanism 60, which is described later. Specifically, as shown in FIGS. 2 to 7 and 9, the housing 40 includes a lever supporter 402, a rear wall 404, a left side wall 406, a right side wall 408, a bottom wall 410, a housing space 412, a pedal opening 414 and a pedal opening space 416. The housing 40 also includes a mechanism opening portion 418, a mechanism opening space 420, a first housing extension 422, a first housing claw 424, a second housing extension 426 and a second housing claw 428.

As shown in FIGS. 4 and 9, the lever supporter 402 extends in the vehicle front-rear direction Da and in the vehicle left-right direction Dc. Further, the rotation shaft O of the lever portion 14 and the stroke sensor 30 are attached to the lever supporter 402. Further, the lever supporter 402 supports a part of the lever portion 14 so that the lever portion 14 is rotatable about the rotation shaft O, and also supports the stroke sensor 30.

Figure 5:
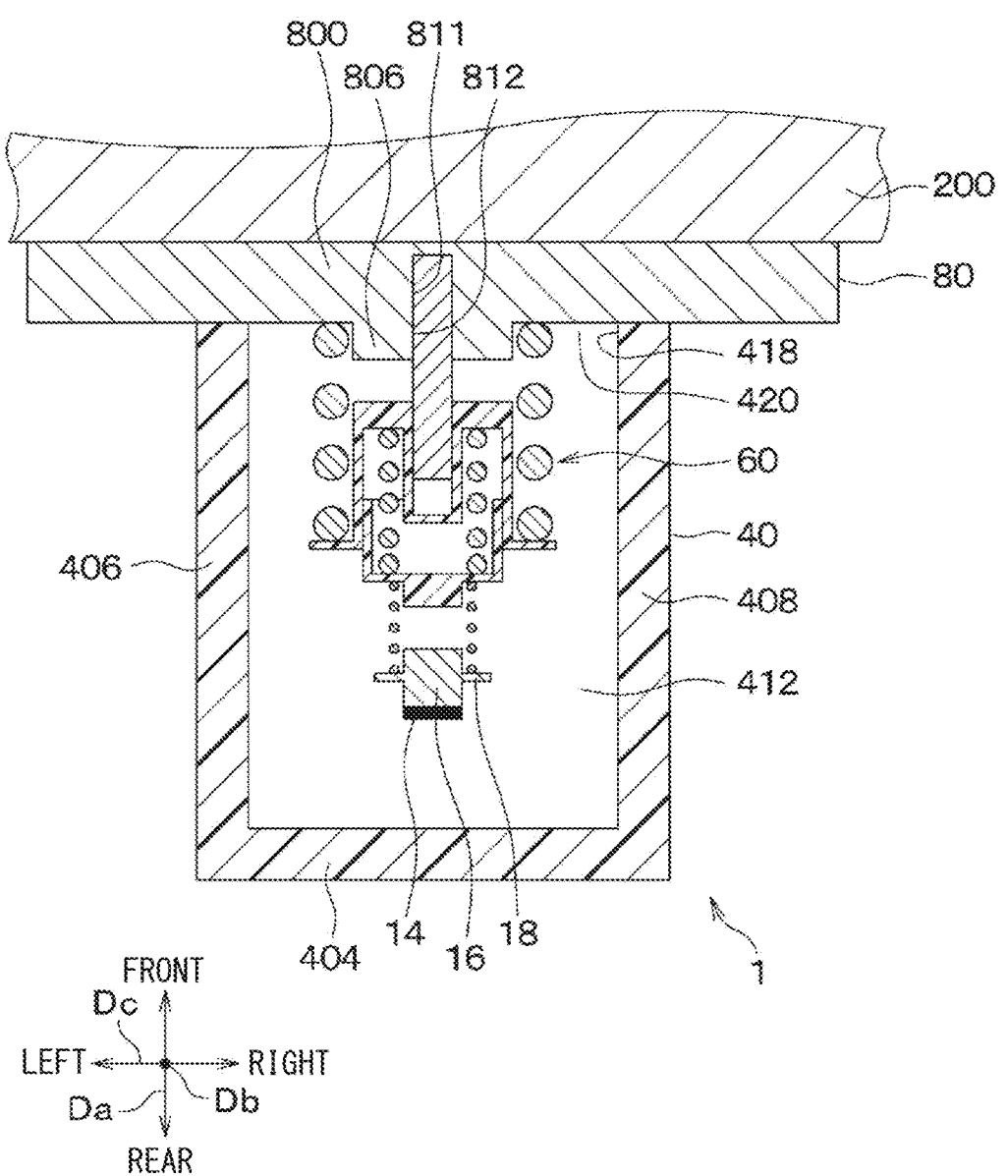
FIG. 5 is a cross-sectional view taken along a line V-V in FIG. 4.

As shown in FIGS. 4, 5 and 9, the rear wall 404 is a wall of the housing 40 on a vehicle rear side. Further, the rear wall 404 is connected to a part of the lever supporter 402 on the vehicle rear side.

As shown in FIG. 5, the left side wall 406 is a wall of the housing 40 on the vehicle left side. Further, the left side wall 406 is connected to a part of the lever supporter 402 on the vehicle left side. Further, the left side wall 406 is connected to a part of the rear wall 404 on the vehicle left side.

The right side wall 408 is a wall of the housing 40 on the vehicle right side. Further, the right side wall 408 is connected to a part of the lever supporter 402 on the vehicle right side. Further, the right side wall 408 is connected to a part of the rear wall 404 on the vehicle right side.

As shown in FIGS. 4 and 9, the bottom wall 410 is a wall of the housing 40 on the vehicle lower side. Further, the bottom wall 410 is connected to a part of the left side wall 406 on the vehicle lower side. Further, the bottom wall 410 is connected to a part of the right side wall 408 on the vehicle lower side.

The housing space 412 is a space defined by the lever supporter 402, the rear wall 404, the left side wall 406, the right side wall 408 and the bottom wall 410, as shown in FIGS. 4, 5, and 9.

As shown in FIGS. 4 and 9, the pedal opening 414 is configured by an end of the rear wall 404 on the vehicle lower side, an end of the left side wall 406 on the vehicle lower side, an end of the right side wall 408 on the vehicle lower side, and an end of the bottom wall 410 on the vehicle rear side.

The pedal opening space 416 is formed by using the pedal opening 414. Further, the pedal opening space 416 communicates with the housing space 412 in the vehicle up-down direction Db, and also communicates with an external space of the housing 40 in the vehicle up-down direction Db. Further, a part of the lever portion 14 is inserted into the pedal opening space 416.

As shown in FIGS. 4, 5 and 9, the mechanism opening portion 418 is composed of an end of the lever supporter 402 on the vehicle front side, an end of the left side wall 406 on the vehicle front side, an end of the right side wall 408 on the vehicle front side, and an end of the bottom wall 410 on the vehicle front side. Therefore, the mechanism opening portion 418 opens and faces in the vehicle front direction.

The mechanism opening space 420 is formed by the mechanism opening portion 418. Further, the mechanism opening space 420 communicates with the housing space 412 in the vehicle front-rear direction Da. Further, the mechanism opening space 420 serves as a space for housing the reaction force generating mechanism 60 in the housing space 412, which is described later in detail.

The first housing extension 422, the first housing claw 424, the second housing extension 426 and the second housing claw 428 form a snap fit.

Figure 6:
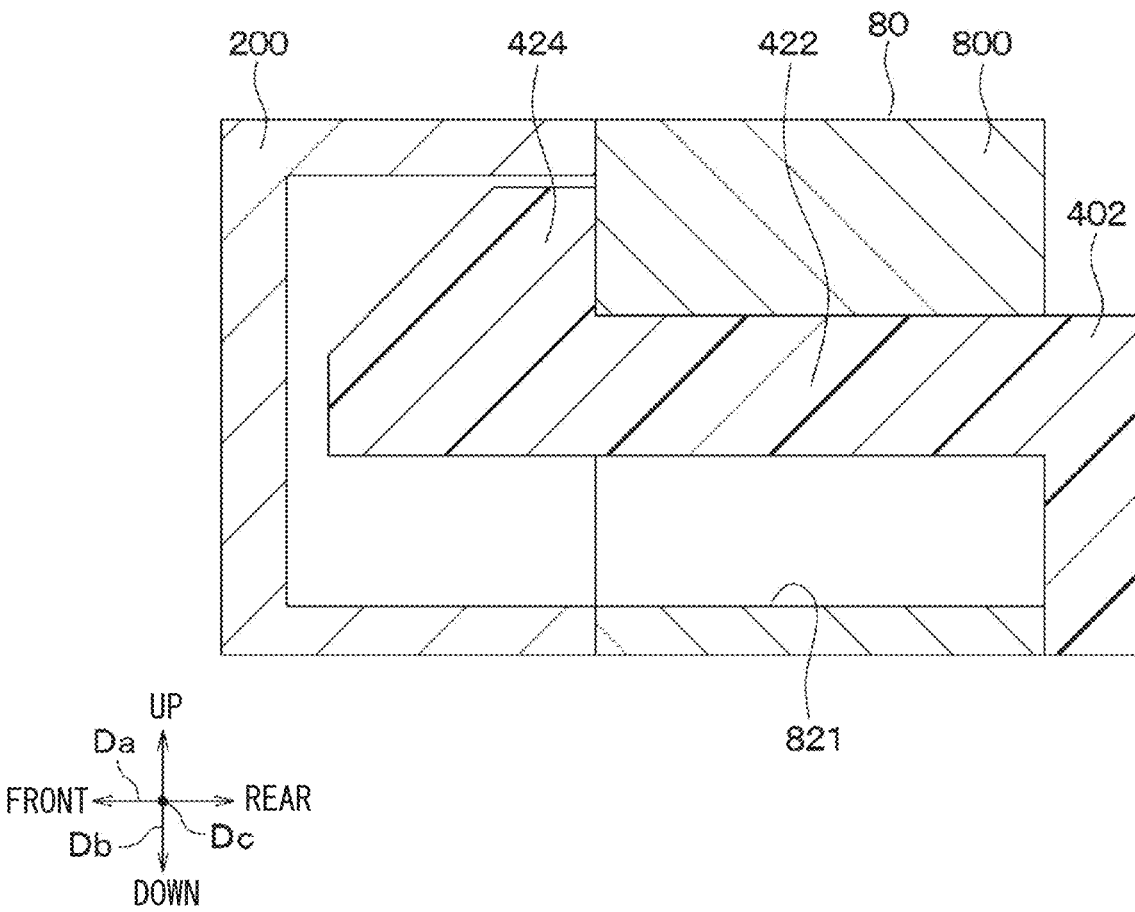
FIG. 6 is an enlarged view of a part VI in FIG. 4.

Specifically, as shown in FIGS. 4, 6 and 9, the first housing extension 422 is connected to an end of the mechanism opening portion 418 positioned on the vehicle front side and on the vehicle upper side, namely, an end of the lever supporter 402 on the vehicle front side. Further, the first housing extension 422 extends in the vehicle front direction from an end of the lever supporter 402 on the vehicle front side.

The first housing claw 424 is connected to a part of the first housing extension 422 opposite to the lever supporter 402. Further, the first housing claw 424 extends from the first housing extension 422 in a direction intersecting the direction in which the first housing extension 422 extends. For example, the first housing claw 424 extends from the first housing extension 422 in a vehicle upward direction.

Figure 7:
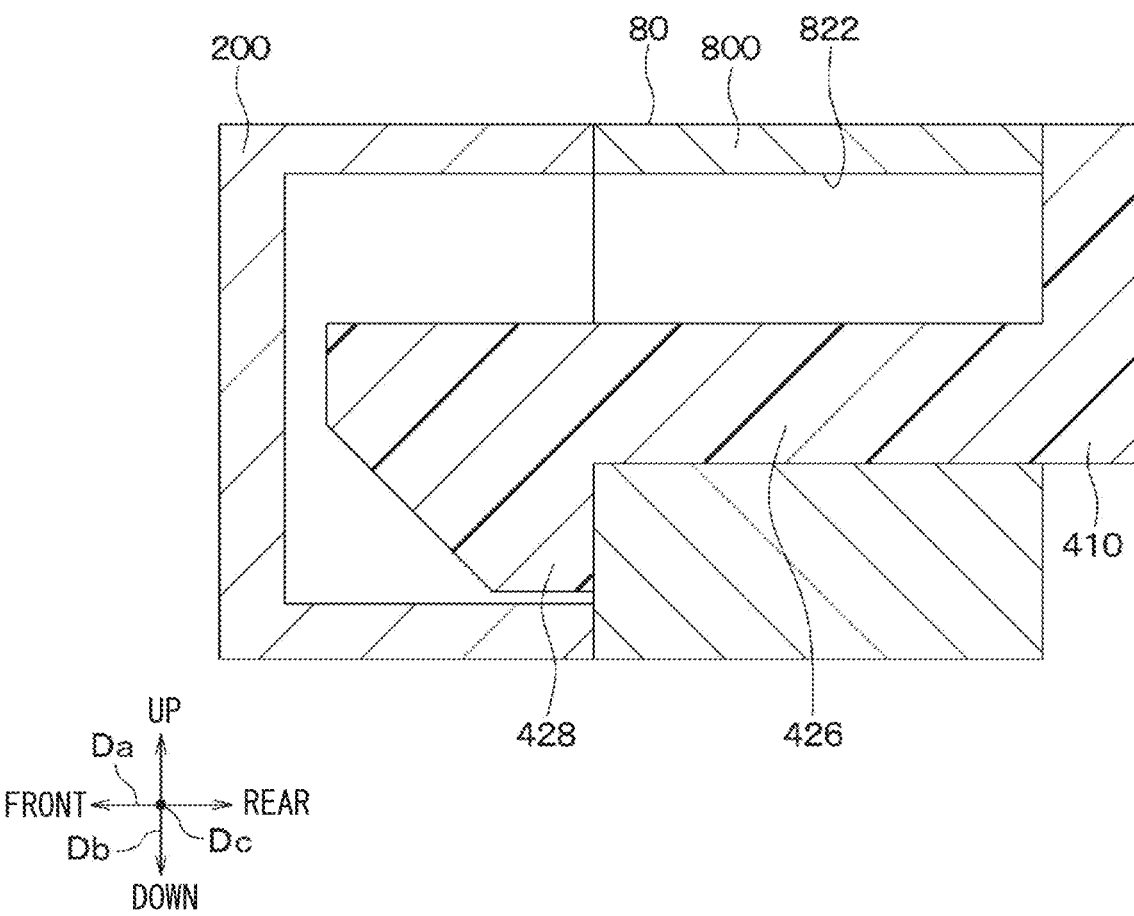
FIG. 7 is an enlarged view of a part VII in FIG. 4.

As shown in FIGS. 4, 7 and 9, the second housing extension 426 is connected to an end of the mechanism opening portion 418 on the vehicle front side and on the vehicle lower side, namely, an end of the bottom wall 410 on the vehicle front side. Further, the second housing extension 426 extends in the vehicle front direction from an end of the bottom wall 410 on the vehicle front side.

The second housing claw 428 is connected to a part of the second housing extension 426 on the opposite side to the bottom wall 410. Further, the second housing claw 428 extends from the second housing extension 426 in a direction intersecting the direction in which the second housing extension 426 extends. For example, the second housing claw 428 extends from the second housing extension 426 in a vehicle downward direction.

As shown in FIGS. 4 and 5, the reaction force generating mechanism 60 generates a reaction force against the pedaling force applied to the pedal portion 12 by the driver. Specifically, as shown in FIG. 8, the reaction force generating mechanism 60 includes a first holder 61, a second holder 62, a guide member 63, a first elastic member 71, a second elastic member 72 and a third elastic member 73.

The first holder 61 is made of, for example, resin. Further, the first holder 61 includes a first support portion 610, a holder protrusion 612, and a first guide portion 614. Although the first holder 61 is made of resin, the material is not limited to such configuration, and the first holder 61 may be made of, for example, metal or the like.

The first support portion 610 is formed, for example, in a plate shape extending in a direction perpendicular to the vehicle front-rear direction Da. The holder protrusion 612 is connected to the first support portion 610, and protrudes from the first support portion 610 in a vehicle rear direction. The first guide portion 614 is formed, for example, in a cylindrical shape extending from one side of the first support portion 610 opposite to the holder protrusion portion 612 toward the vehicle front direction.

The second holder 62 is made of, for example, resin. Further, the second holder 62 includes a second support portion 620, a second guide portion 622, a third guide portion 623, and a third support portion 626. Although the second holder 62 is made of resin, the material is not limited to such configuration and the second holder 62 may be made of, for example, metal or the like.

The second support portion 620 is formed in a plate shape extending in a direction perpendicular to the vehicle front-rear direction Da, and is formed in an annular shape.

The second guide portion 622 is connected to an outer periphery of the second support portion 620 in a direction perpendicular to the vehicle front-rear direction Da, and is formed in a cylindrical shape extending in the vehicle rear direction from a boundary with the second support portion 620. Further, a part of the first guide portion 614 is inserted into a hole of the second guide portion 622. In such manner, movement of the first guide portion 614 and the second guide portion 622 in the vehicle up-down direction Db is mutually regulated. Further, since the first guide portion 614 and the second guide portion 622 extend in the vehicle front-rear direction Da, an outer surface of the first guide portion 614 and an inner surface of the second guide portion 622 slide along the vehicle front-rear direction Da.

The third guide portion 623 is connected to an inner periphery of the second support portion 620 in a direction perpendicular to the vehicle front-rear direction Da, and is formed in a bottomed cylindrical shape extending in the vehicle rear direction from a boundary with the second support portion 620.

The third support portion 626 is formed in a plate shape extending in a direction perpendicular to the vehicle front-rear direction Da, and is formed in an annular shape. Further, the third support portion 626 is connected to one side of the second guide portion 622 opposite to the second support portion 620, and is therefore disposed further away in the vehicle rear than the second support portion 620. Further, a part of the first guide portion 614 is inserted into a hole of the third support portion 626.

The guide member 63 is made of, for example, a metal. Further, the guide member 63 is formed in a cylindrical shape extending in the vehicle front-rear direction Da. Further, a part of the guide member 63 is inserted into a hole of the second support portion 620 and a hole of the third guide portion 623. In such manner, movement of the third guide portion 623 and the guide member 63 in the vehicle up-down direction Db is mutually regulated. Further, since the third guide portion 623 and the guide member 63 extend in the vehicle front-rear direction Da, an inner surface of the third guide portion 623 and an outer surface of the guide member 63 slide along the vehicle front-rear direction Da.

Here, the first elastic member 71, the second elastic member 72 and the third elastic member 73 are arranged in series. Specifically, the first elastic member 71 is, for example, a coil spring, and is elastically deformable in the vehicle front-rear direction Da. Further, the third guide portion 623 is disposed on an inside of the first elastic member 71. In such manner, movement of the first elastic member 71 in the vehicle up-down direction Db is regulated. Further, the first elastic member 71 is in contact with the first support portion 610 and the second support portion 620, and is thereby supported by the first support portion 610 and the second support portion 620. When the pedal portion 12 is not pedaled by the driver, the first elastic member 71 is elastically deformed, i.e., is compressed. In the present embodiment, when the pedal portion 12 is not pedaled by the driver, the first elastic member 71 is elastically deformed. However, the present embodiment is not limited to such configuration, and the pedal portion 12 may be not elastically deformed. In such case, the length of the first elastic member 71 is a free length.

The second elastic member 72 is, for example, a coil spring, and is elastically deformable in the vehicle front-rear direction Da. Further, the second elastic member 72 is in contact with the third support portion 626 and the support member 80 described below, and is thereby supported by the second support portion 620 and the support member 80 described below. Further, the second support portion 620, the second guide portion 622, and the support member 80 described later are disposed on an inside of the second elastic member 72. In such manner, movement of the second elastic member 72 in the vehicle up-down direction Db is regulated. Further, when the second elastic member 72 is projected toward the first elastic member 71 in the vehicle up-down direction Db, the projected second elastic member 72 and the first elastic member 71 overlap each other. When the pedal portion 12 is not pedaled by the driver, the second elastic member 72 is elastically deformed, i.e., is compressed. In the present embodiment, when the pedal portion 12 is not pedaled by the driver, the second elastic member 72 is elastically deformed. However, the present embodiment is not limiting and the second elastic member 72 may be not elastically deformed. In such case, the length of the second elastic member 72 is a free length.

The third elastic member 73 is, for example, a coil spring, and is elastically deformable in the vehicle front-rear direction Da. Further, the third elastic member 73 is in contact with the first support portion 610, and is thereby supported by the first support portion 610. Further, the holder protrusion 612 is disposed on an inside of the third elastic member 73. In such manner, movement of the third elastic member 73 in the vehicle up-down direction Db is regulated. Further, when the pedal portion 12 is not pedaled by the driver, a part of the lever protrusion 16 is inserted inside the third elastic member 73, thereby the third elastic member 73 is in contact with the lever flange 18. At this time, the third elastic member 73 is elastically deformed, i.e., is compressed. In the present embodiment, when the pedal portion 12 is not pedaled by the driver, the third elastic member 73 is elastically deformed. However, the present embodiment is not limiting and the third elastic member 73 may be not elastically deformed. In such case, the length of the third elastic member 73 is a free length. Further, when the pedal portion 12 is not pedaled by the driver, the third elastic member 73 and the lever flange 18 are in contact with each other, but such configuration is not limiting. When the pedal portion 12 is not pedaled by the driver, the third elastic member 73 and the lever flange 18 may be separated from each other, and therefore the third elastic member 73 and the lever flange 18 may be out of contact with each other.

The support member 80 supports the reaction force generating mechanism 60. As shown in FIG. 1, the support member 80 is attached to a dash panel 200 of the vehicle 6. Here, the dash panel 200 is a partition wall that separates a vehicle outside 7, such as an engine room and the like, from a vehicle compartment 8 of the vehicle 6, which is sometimes called as a bulkhead. Further to the engine of the vehicle 6, for example, a battery and an air conditioner of the vehicle 6 are also arranged in the vehicle outside 7.

Specifically, as shown in FIGS. 4 to 9, the support member 80 includes a support portion 800, a panel hole 802, a panel bolt 804, an elastic member regulating portion 806, a first guide member hole 811, a second guide member hole 812, a first member hole 821 and a second member hole 822.

The support portion 800 is, for example, made of metal and has a plate shape extending in the vehicle up-down direction Db and the vehicle left-right direction Dc. Further, the support portion 800 supports a part of the second elastic member 72 opposite to the third support portion 626. It should be noted that, although the support portion 800 is formed of a metal, the material is not limited to such configuration. For example, the support portion 800 may be formed of a resin.

The panel hole 802 is formed on the support portion 800 as shown in FIG. 4. Further, a panel bolt 804 is inserted into the panel hole 802 and into a hole on the dash panel 200. In such manner, the support member 80 is attached to the dash panel 200. The pedal device 1 is thereby attached to the dash panel 200.

The elastic member regulating portion 806 is connected to the support portion 800, and protrudes from a boundary with the support portion 800 in the vehicle rear direction. Further, the elastic member regulating portion 806 is disposed on an inside of the second elastic member 72 as shown in FIG. 8. Therefore, movement of the second elastic member 72 in the vehicle up-down direction Db is regulated.

The first guide member hole 811 is formed on the support portion 800 as shown in FIGS. 4, 5, 8 and 9. The second guide member hole 812 is formed on the elastic member regulating portion 806 and communicates with the first guide member hole 811. Further, a part of the guide member 63 is inserted into the first guide member hole 811 and the second guide member hole 812. In such manner, the support member 80 and the guide member 63 are fixed together.

As shown in FIGS. 4, 6 and 9, the first member hole 821 is formed on a part of the support portion 800 on the vehicle upper side. The first member hole 821 is a through hole extending in the vehicle front-rear direction Da. It should be noted that the first member hole 821 is not limited to being a through hole. The first member hole 821 may be, for example, a bottomed hole. In such case, the first member hole 821 is formed, for example, by a 3D printer or the like.

Here, as shown in FIG. 9, when the first housing claw 424 is inserted into the first member hole 821, the first housing extension 422 is elastically deformed. Further, when the support member 80 and the housing 40 are brought closer to each other, the shape of the first housing extension 422 returns to its original shape and the first housing extension 422 is inserted into the first member hole 821 as shown in FIG. 4. At this time, the first housing claw 424 and the support portion 800 come into contact with each other. In such manner, the support portion 800 and the mechanism opening portion 418 are connected, and the support member 80 and the housing 40 are engaged with each other. Further, in order to prevent contact between first housing claw 424 and dash panel 200, a recess corresponding to the shape of first housing claw 424 is formed on the dash panel 200.

As shown in FIGS. 4, 7 and 9, the second member hole 822 is formed on a part of the support portion 800 on the vehicle lower side. The second member hole 822 is a through hole extending in the vehicle front-rear direction Da. It should be noted that the second member hole 822 is not limited to being a through hole. The second member hole 822 may be, for example, a bottomed hole. In such case, the second member hole 822 is formed, for example, by a 3D printer or the like.

Further, here, as shown in FIG. 9, when the second housing claw 428 is inserted into the second member hole 822, the second housing extension 426 is elastically deformed. Further, when the support member 80 and the housing 40 are brought closer to each other, the shape of the second housing extension 426 returns to its original shape and the second housing extension 426 is inserted into the second member hole 822 as shown in FIG. 4. At this time, the second housing claw 428 and the support portion 800 come into contact with each other. In such manner, the support portion 800 and the mechanism opening portion 418 are connected, and the support member 80 and the housing 40 are engaged with each other. Further, in order to prevent contact between the second housing claw 428 and the dash panel 200, a recess corresponding to the shape of the second housing claw 428 is formed on the dash panel 200.

Further, since the support portion 800 and the mechanism opening portion 418 are connected, the support portion 800 closes the mechanism opening space 420. Further, the second elastic member 72 supported by the support portion 800 is inserted into the housing space 412 and the mechanism opening space 420. In such manner, the reaction force generating mechanism 60 is housed in the housing space 412 and is surrounded by the support member 80 and the housing 40.

The brake-by-wire system 150 is configured as described above. Next, the operation of the pedal device 1 is described with reference to FIGS. 4 and 8.

When the pedal portion 12 is pedaled by the driver of the vehicle 6, the lever portion 14 rotates together with the pedal portion 12 about the rotation shaft O. In such manner, a force from the pedal portion 12 is transmitted to the third elastic member 73 via the lever flange 18, and the third elastic member 73 is compressed. Further, the force from the pedal portion 12 is transmitted to the first holder 61. In such manner, as the first holder 61 moves toward the vehicle front, the outer surface of the first guide portion 614 slides along the inner surface of the second guide portion 622 in the vehicle front direction, and the first elastic member 71 is compressed by being pressed against the first support portion 610. Further, the force from the pedal portion 12 is transmitted to the second holder 62. In such manner, as the second holder 62 moves toward the vehicle front, the inner surface of the third guide portion 623 slides along the outer surface of the guide member 63 in the vehicle front direction, and the second elastic member 72 is compressed by being pressed against the third support portion 626. Therefore, a reaction force is generated as a restoring force generated when the first elastic member 71, the second elastic member 72, and the third elastic member 73 are compressed. Due to the reaction force, even if a mechanical connection between the pedal 10 and the master cylinder 126 is eliminated, the pedal device 1 can obtain a reaction force similar to that obtained when the pedal device 1 is connected to the master cylinder 126, i.e., when a reaction force is obtained by hydraulic pressure.

At this time, the stroke sensor 30 detects the rotation angle of the lever portion 14, thereby detecting the rotation angle and stroke amount of the pedal portion 12. Further, the stroke sensor 30 outputs the detected rotation angle and stroke amount of the pedal portion 12 to the first ECU 111 and the second ECU 112.

At this time, the first ECU 111 rotates the motor 123 by, for example, supplying electric power to the motor 123. In such manner, the gear mechanism 125 is driven, and the master piston 127 moves. In such manner, the hydraulic pressure of the brake fluid supplied from the reservoir 124 to the master cylinder 126 increases. The increased hydraulic pressure is supplied to the second brake circuit 122.

Further, the second ECU 112 supplies electric power to, for example, the solenoid valve (not shown) of the second brake circuit 122. In such manner, the solenoid valve of the second brake circuit 122 opens. Therefore, the brake fluid supplied to the second brake circuit 122 is supplied to each of the wheel cylinders 131 to 134. Therefore, the brake pads attached to the wheel cylinders 131 to 134 rub against the corresponding brake discs. In such manner, each wheel is braked, causing the vehicle 6 to decelerate. At this time, the second ECU 112 may perform ABS control, VSC control, collision avoidance control, regenerative coordination control, and the like, based on a signal from the stroke sensor 30 and signals from other electronic control devices not shown. ABS stands for Anti-lock Braking System. Further, VSC stands for Vehicle Stability Control.

When the driver of the vehicle 6 stops pedaling the pedal portion 12, the first holder 61 and the second holder 62 are pushed back toward the vehicle rear by the restoring forces of the first elastic member 71 and the second elastic member 72. In such manner, the outer surface of the first guide portion 614 slides along the inner surface of the second guide portion 622 in the vehicle rear direction, and the inner surface of the third guide portion 623 slides along the outer surface of the guide member 63 in the vehicle rear direction. Further, the lever flange 18 is pushed back by the restoring force of the third elastic member 73. Therefore, the position of the pedal 10 returns to an initial position when the pedal portion 12 is not pedaled by the driver of the vehicle 6.

In such manner, the pedal device 1 operates. In such pedal device 1, an intrusion of foreign matter into the elastic member is suppressed. Next, a prevention structure for preventing the intrusion of foreign matter is described.

For example, in a comparative example of a pedal device, a spring housing may be attached to an outside of a pedal housing, and a part of a spring may be exposed to an outside of the spring housing. In this case, because the spring is exposed to an outside of the pedal device, foreign matter such as dust, water and the like may easily enter into the spring from outside the pedal device. Therefore, deformation of the spring is easily affected.

In contrast, the pedal device 1 of the present embodiment includes the pedal 10, the second elastic member 72 of the reaction force generating mechanism 60, the housing 40, and the support member 80. The pedal 10 rotates about the rotation shaft O when pedaled by the driver of the vehicle 6. The second elastic member 72 is deformed by a force from the pedal 10 when the pedal 10 rotates, thereby generating a reaction force against the pedaling force by the driver of the vehicle 6. The housing 40 rotatably supports the pedal 10, and defines the housing space 412. The second elastic member 72 is housed in the housing space 412. The support member 80 supports the second elastic member 72. The driver of the vehicle 6 corresponds to the operator.

Further, the housing 40 includes the mechanism opening portion 418. The mechanism opening portion 418 defines a mechanism opening space 420. The mechanism opening space 420 is a space defined by the mechanism opening portion 418 opening and facing in the vehicle front direction. Further, the mechanism opening space 420 communicates with the housing space 412. Further, since the housing 40 and the support member 80 are connected to each other, the support member 80 closes the mechanism opening space 420, and the second elastic member 72 is surrounded by the housing 40 and the support member 80 due to such closure. The vehicle front direction corresponds to one direction.

In such manner, the second elastic member 72 is prevented from being exposed to the outside of the pedal device 1, and the housing 40 and the support member 80 prevent foreign matter from entering from the outside of the pedal device 1 toward the second elastic member 72. Therefore, intrusion of foreign matter into the second elastic member 72 is suppressed.

Further, since the reaction force generating mechanism 60 is surrounded by the housing 40 and the support member 80, it becomes more difficult for people to tamper with the pedal device 1 or to disassemble the pedal device 1. Therefore, tampering and disassembly of the pedal device 1 are suppressed.

Moreover, the first embodiment also provides the following effects.

[1-1] The second elastic member 72 is a coil spring. In such manner, the effect of temperature on an elastic modulus of the second elastic member 72 is relatively small. Further, the second elastic member 72 has relatively high resistance to oils, solvents, and chemicals. Therefore, the second elastic member 72 is relatively resistant to deterioration, and a stable reaction force is generated.

[1-2] The housing 40 is disposed on a vehicle compartment 8 side of the dash panel 200. The dash panel 200 corresponds to a partition wall that separates the vehicle outside 7 of the vehicle 6 from the interior 8 of the vehicle 6. Further, the mechanism opening portion 418 opens toward the vehicle front. The vehicle front direction corresponds to a direction from the housing 40 to the dash panel 200.

In such manner, it is easy to attach the pedal device 1 to the dash panel 200. Specifically, the support member 80 is disposed at a position between the housing 40 and the dash panel 200 to connect the housing 40 and the support member 80 in the vehicle front-rear direction Da. Thereafter, the pedal device 1 is attached to the dash panel 200 without being turned over and with an attitude of the pedal device 1 remaining as it is. Therefore, it is easy to attach the pedal device 1 to the dash panel 200. Therefore, the pedal device

1 and the dash panel 200 can be easily assembled together. Thus, an assembly cost of the pedal device 1 is reducible.

[1-3] The housing 40 includes the first housing extension 422, the first housing claw 424, the second housing extension 426, and the second housing claw 428. The first housing extension 422 and the second housing extension 426 extend from the mechanism opening portion 418 in the vehicle front direction. The first housing claw 424 is connected to the first housing extension 422 and extends from the first housing extension 422 in the vehicle upward direction. The second housing claw 428 is connected to the second housing extension 426 and extends from the second housing extension 426 in the vehicle downward direction. It should be noted that the first housing extension 422 and the second housing extension 426 correspond to an extension portion. The first housing claw 424 and the second housing claw 428 correspond to a claw portion. The vehicle upward direction and the vehicle downward direction correspond to directions intersecting the direction in which the extension portion extends.

Further, the support member 80 includes the first member hole 821 and the second member hole 822. The first housing extension 422 is inserted into the first member hole 821. The second housing extension 426 is inserted into the second member hole 822. Further, the first housing claw 424 and the second housing claw 428 are in contact with the support member 80, thereby the housing 40 and the support member 80 are engaged with each other. In such manner, it is easy for the housing 40 and the support member 80 to be held together. The first member hole 821 and the second member hole 822 respectively correspond to a member space.

[1-4] The first housing extension 422 is deformed when the first housing claw 424 is inserted into the first member hole 821. Further, the second housing extension 426 is deformed when the second housing claw 428 is inserted into the second member hole 822.

In such manner, it is easy to insert the first housing extension 422 into the first member hole 821 with a single action without using a jig or the like. Further, the second housing extension 426 is easily inserted into the second member hole 822 with a single action without using a jig or the like. Therefore, the housing 40 and the support member 80 are easily assembled together. Further, since there is no need to use a jig or the like, the assembly costs of the pedal device 1 are reducible.

Further, since it is no longer necessary to fasten the housing 40 and the support member 80 using bolts or the like, the number of parts of the pedal device 1 is reducible. Further, since the number of parts of the pedal system 1 is reduced, the cost of the pedal system 1 is reducible.

[1-5] The support member 80 includes the support portion 800 and the elastic member regulating portion 806. The support portion 800 supports the second elastic member 72. The elastic member regulating portion 806 extends from the support portion 800 in a deformation direction of the second elastic member 72. Further, the elastic member regulating portion 806 regulates the movement of the second elastic member 72 in the vehicle up-down direction Db. The vehicle up-down direction Db corresponds to a direction perpendicular to the deformation direction of the second elastic member 72.

In such manner, it is easy for the second elastic member 72 to stand upright relative to the support portion 800. In such manner, it is easy for the second elastic member 72 to be inserted into the mechanism opening space 420. Therefore, the housing 40 and the support member 80 are easily assembled together.

[1-6] The support member 80 supports one end of the second elastic member 72. The pedal device 1 includes the second holder 62. The second holder 62 includes the third support portion 626 and the second guide portion 622. The third support portion 626 supports the other end of the second elastic member 72. The second guide portion 622 extends from the third support portion 626 in the deformation direction of the second elastic member 72. Further, the second guide portion 622 regulates the movement of the second elastic member 72 in the vehicle up-down direction Db. The third support portion 626 corresponds to a member support portion. The second guide portion 622 corresponds to a member regulating portion.

In such manner, it is easy for the second elastic member 72 to stand upright. Therefore, it is easy for the second elastic member 72 to be inserted into the mechanism opening space 420. As a result, it is easy to assemble the housing 40 and the support member 80 together.

Second Embodiment

Figure 10:
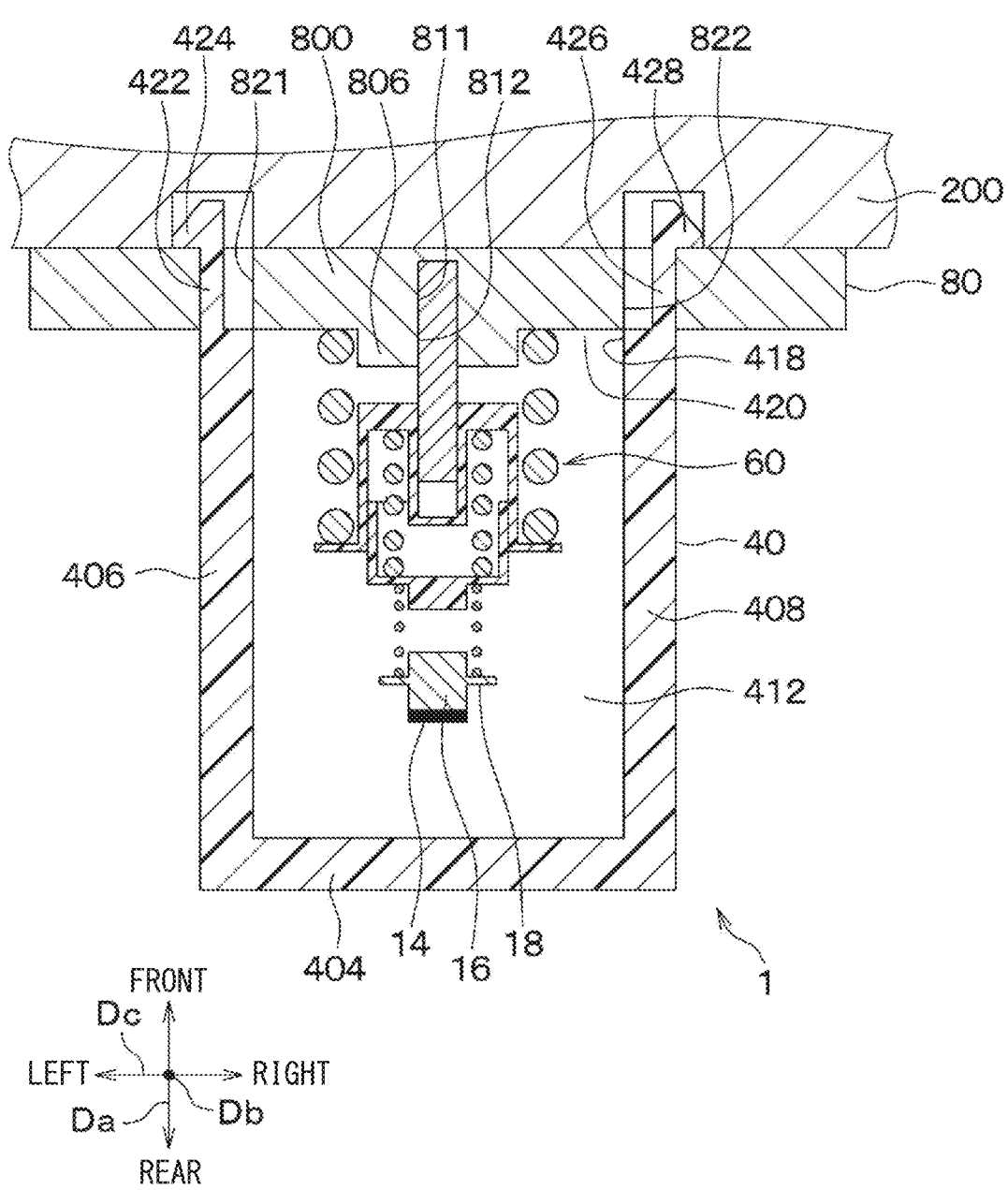
FIG. 10 is a cross-sectional view of a pedal device according to a second embodiment.

In the second embodiment, as shown in FIG. 10, the shapes of a first housing extension 422, a first housing claw 424, a second housing extension 426, and a second housing claw 428 are made to be different from those of the first embodiment. Further, the shapes of a first member hole 821 and a second member hole 822 are different from those in the first embodiment. Other than the above, the same configuration as the first embodiment is adopted.

The first housing extension 422 is connected to an end of the mechanism opening portion 418 on the vehicle front side and on the vehicle left side, i.e., an end of the left side wall 406 on the vehicle front side. The first housing extension 422 extends in the vehicle front direction from the end of the left side wall 406 on the vehicle front side. Further, the first housing extension 422 is inserted into the first member hole 821 formed at a position corresponding to the first housing extension 422.

The first housing claw 424 is connected to one side of the first housing extension 422 opposite to the left side wall 406. Further, the first housing claw 424 extends from the first housing extension 422 toward the vehicle left side. Further, the first housing claw 424 is in contact with a support portion 800. In such manner, the support portion 800 and the mechanism opening portion 418 are connected, and the support member 80 and the housing 40 are engaged with each other.

The second housing extension 426 is connected to an end of the mechanism opening portion 418 on the vehicle front side and on the vehicle right side, i.e., an end of the right side wall 408 on the vehicle front side. The second housing extension 426 extends in the vehicle front direction from an end of the right side wall 408 on the vehicle front side. Further, the second housing extension 426 is inserted into the second member hole 822 formed at a position corresponding to the second housing extension 426.

The second housing claw 428 is connected to the second housing extension 426 on an opposite side to the right side wall 408. Further, the second housing claw 428 extends from the second housing extension 426 towards the vehicle right side. Further, the second housing claw 428 is in contact with the support portion 800. Therefore, the support portion 800 and the mechanism opening portion 418 are connected, and the support member 80 and the housing 40 are engaged with each other. Further, since the support portion 800 and the mechanism opening portion 418 are connected, the support portion 800 closes the mechanism opening space 420. Further, the second elastic member 72 supported by the support portion 800 is inserted into the housing space 412 and the mechanism opening space 420. In such manner, a reaction force generating mechanism 60 is housed in the housing space 412 and is surrounded by the support member 80 and the housing 40.

A pedal device 1 of the second embodiment is configured as described above. With this, the second embodiment also provides the same effects as the first embodiment.

Third Embodiment

Figure 11:
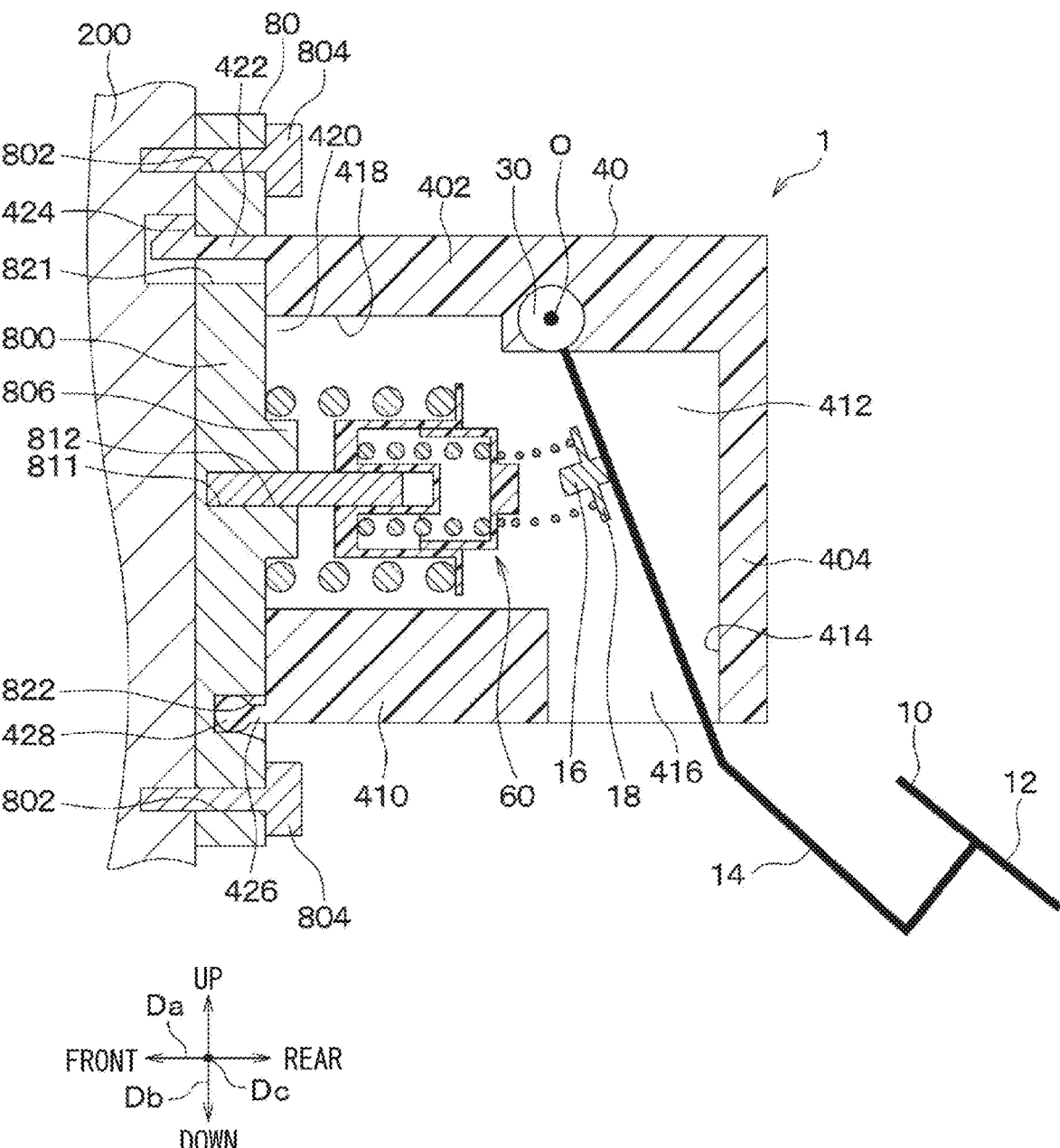
FIG. 11 is a cross-sectional view of a pedal device according to a third embodiment.
Figure 12:
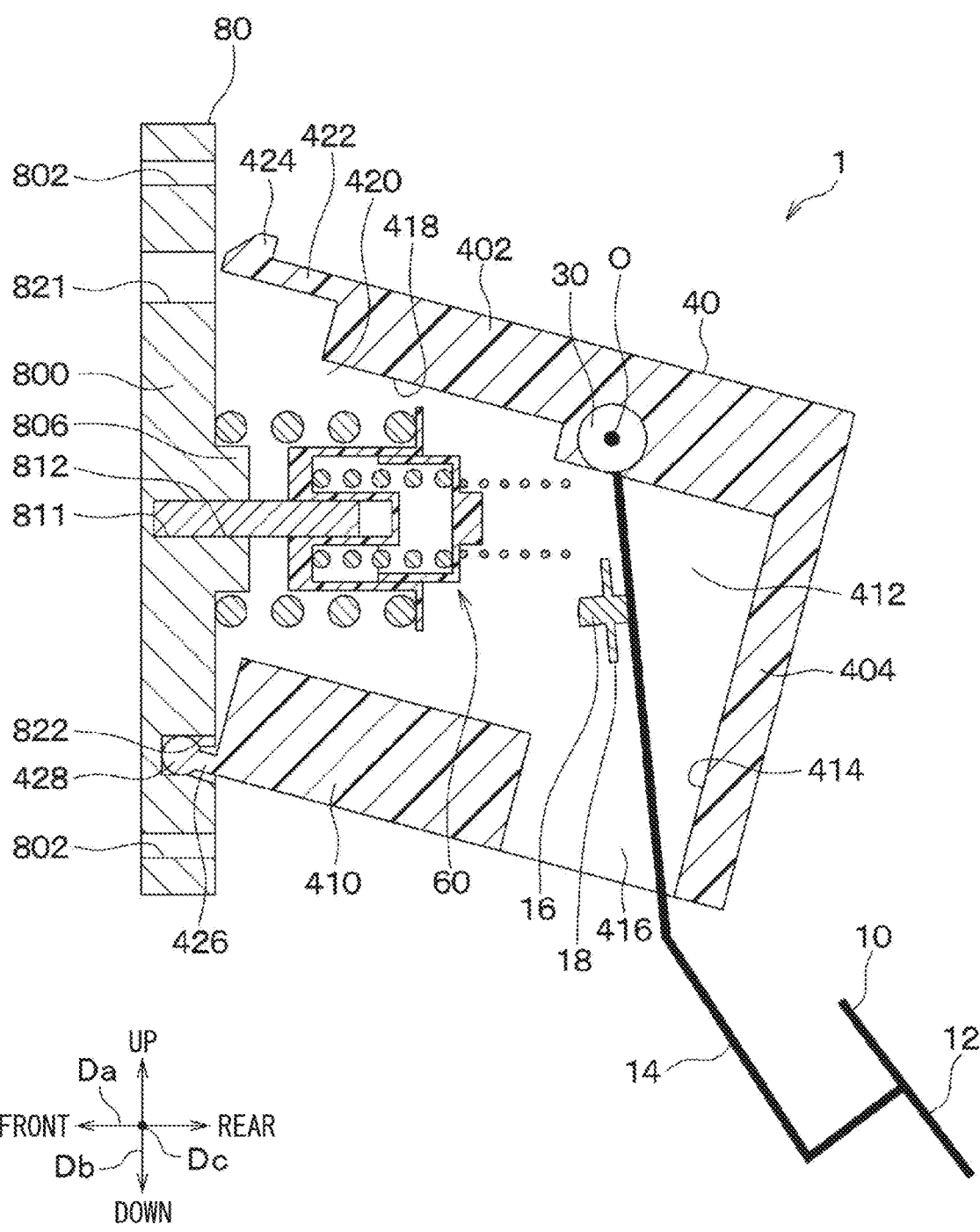
FIG. 12 is a cross-sectional view showing rotation of a housing of the pedal device.

In the third embodiment, as shown in FIGS. 11 and 12, the configurations of a second housing claw 428 and a second member hole 822 are different from those in the first embodiment. Other than the above, the same configuration as the first embodiment is adopted.

The second housing claw 428 is formed in a cylindrical shape having an axis extending in a vehicle left-right direction Dc. Further, the second housing extension 426 and the second housing claw 428 are inserted into a second member hole 822. Further, the second member hole 822 is formed in a shape and size that allows a housing 40 to rotate around the axis of the second housing claw 428.

The pedal device 1 of the third embodiment is configured as described above. The third embodiment also provides the same effects as the first embodiment. Moreover, the third embodiment also provides the following effects.

[2] The second housing claw 428 is connected to the second housing extension 426 and rotates about the axis extending in the vehicle left-right direction Dc. Further, when the second housing claw 428 rotates, the housing 40 rotates about the axis of the second housing claw 428, causing a first housing claw 424 to be inserted into a first member hole 821. It should be noted that a first housing extension 422 corresponds to a first extension portion. The first housing claw 424 corresponds to a first claw. The second housing extension 426 corresponds to a second extension portion. The second housing claw 428 corresponds to a second claw. The vehicle left-right direction Dc corresponds to a direction perpendicular to a one direction.

According to the above, the housing 40 and the support member 80 are assembled together by rotating the housing 40. In such manner, the degree of freedom in assembling the housing 40 and the support member 80 is improvable.

Fourth Embodiment

Figure 13:
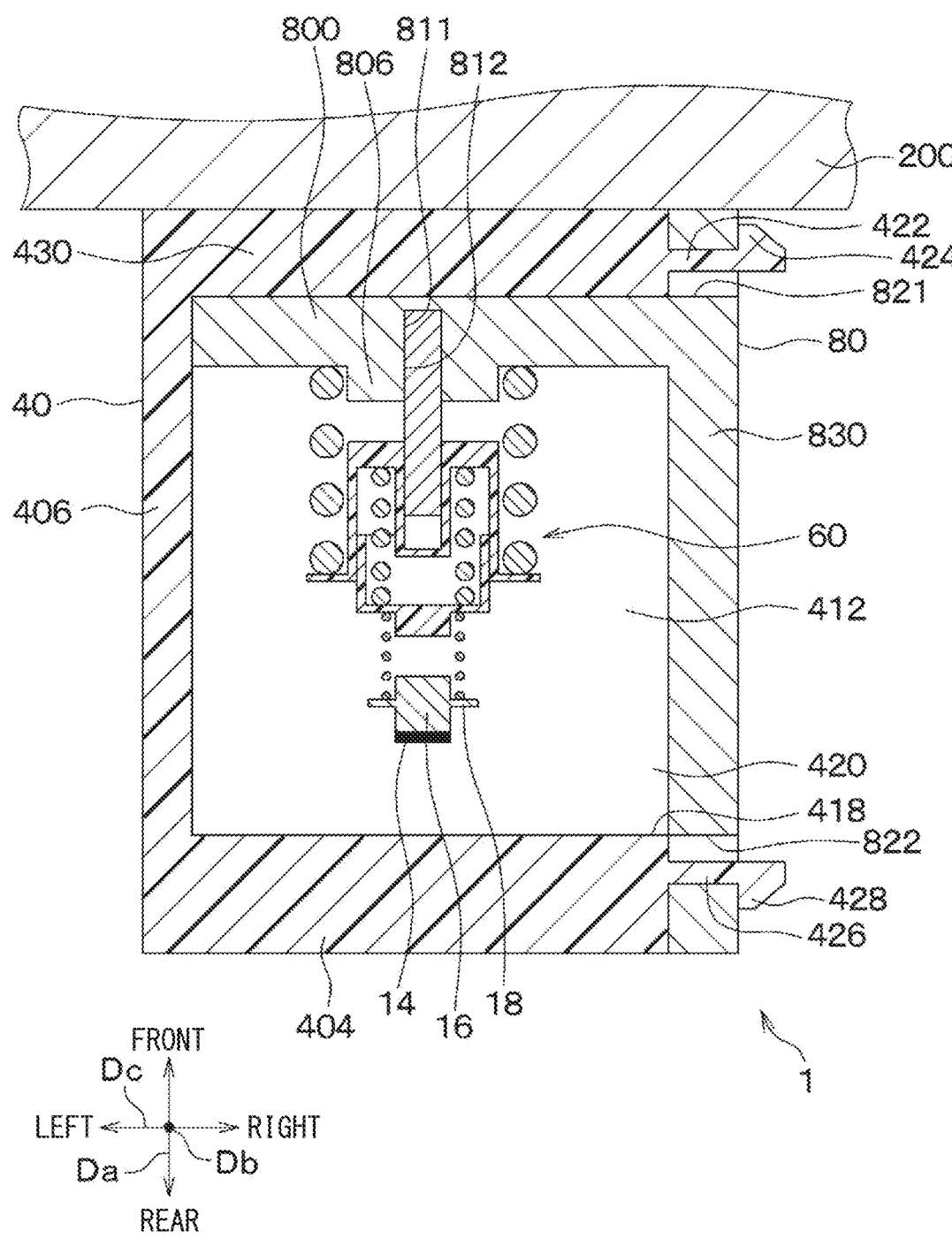
FIG. 13 is a cross-sectional view of a pedal device according to a fourth embodiment.

In the fourth embodiment, as shown in FIG. 13, a housing 40 includes a front wall 430 instead of the right side wall 408. Further, the shapes of a housing space 412, a pedal opening 414, a mechanism opening portion 418 and a mechanism opening space 420 are different from those in the first embodiment. Further, the shapes of a first housing extension 422, a first housing claw 424, a second housing extension 426 and a second housing claw 428 are different from those in the first embodiment. Further, a support member 80 further includes a support member extension 830. Further, the shapes of a first member hole 821 and a second member hole 822 are different from those in the first embodiment. Other than the above, the same configuration as the first embodiment is adopted.

The front wall 430 is a wall of the housing 40 on the vehicle front side. Further, the front wall 430 is connected to (i) a part of a lever supporter 402 facing the vehicle front, (ii) a part of a left side wall 406 facing the vehicle front, and (iii) a part of a bottom wall 410 facing the vehicle front. It should be noted that a panel hole 802 is formed on the front wall 430, and the front wall 430 is positioned further forward of a support portion 800 in the vehicle. Therefore, the support portion 800 does not have the panel hole 802 formed thereon. Further, a panel bolt 804 is inserted into the panel hole 802 on the front wall 430 and a hole on a dash panel 200. In such manner, the housing 40 is attached to the dash panel 200. A pedal device 1 is thereby attached to the dash panel 200.

The housing space 412 is a space defined by the lever supporter 402, a rear wall 404, the left side wall 406, the bottom wall 410 and the front wall 430.

The pedal opening 414 is defined by an end of the rear wall 404 on the vehicle lower side, an end of the left side wall 406 on the vehicle lower side, and an end of the bottom wall 410 on the vehicle rear side.

The mechanism opening portion 418 is formed by an end of the lever supporter 402 on the vehicle right side, an end of the rear wall 404 on the vehicle right side, an end of the bottom wall 410 on the vehicle right side, and an end of the front wall 430 on the vehicle right side. Therefore, the mechanism opening portion 418 opens and faces in the vehicle right direction. Here, the vehicle right direction corresponds to one direction.

The mechanism opening space 420 is formed by the mechanism opening portion 418 and communicates with the housing space 412 in the vehicle left-right direction Dc.

The first housing extension 422 is connected to an end of the mechanism opening portion 418 on the vehicle front side and on the vehicle right side, i.e., an end of the front wall 430 on the vehicle right side. Further, the first housing extension 422 extends in the vehicle right direction from an end of the front wall 430 on the vehicle right side.

The first housing claw 424 is connected to one side of the first housing extension 422 opposite to the front wall 430. Further, the first housing claw 424 extends from the first housing extension 422 in the vehicle front direction.

The second housing extension 426 is connected to an end of the mechanism opening portion 418 on the vehicle rear side and on the vehicle right side, i.e., an end of the rear wall 404 on the vehicle right side. The second housing extension 426 extends in the vehicle right direction from an end of the rear wall 404 on the vehicle right side.

The second housing claw 428 is connected to the second housing extension 426 on an opposite side to the rear wall 404. Further, the second housing claw 428 extends from the second housing extension 426 in the vehicle rear direction.

The support member extension 830 is connected to a part of the support portion 800 on the vehicle right side. The support member extension 830 is made of metal and has a plate shape extending in the vehicle front-rear direction Da and in the vehicle up-down direction Db. It should be noted that, although the support member extension 830 is formed of a metal, the material is not limited to such configuration. For example, the support member extension 830 may be formed of a resin.

Instead of being formed on the support portion 800, the first member hole 821 is formed on the support member extension 830. The first member hole 821 is a hole that extends in the vehicle left-right direction Dc. Further, the first housing extension 422 is inserted into the first member hole 821. Further, the first housing claw 424 and the support member extension 830 are in contact with each other. In such manner, the support member extension 830 is connected to the mechanism opening portion 418, and the support member 80 is engaged with the housing 40.

Instead of being formed on the support portion 800, the second member hole 822 is formed on the support member extension 830. The second member hole 822 is a hole that extends in the vehicle left-right direction Dc. Further, the second housing extension 426 is inserted into the second member hole 822. Further, the second housing claw 428 and the support member extension 830 are in contact with each other. In such manner, the support member extension 830 is connected to the mechanism opening portion 418, and the support member 80 is engaged with the housing 40.

Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the fourth embodiment is configured as described above. The fourth embodiment also provides the same effects as the first embodiment. In the fourth embodiment, the housing 40 may have a right side wall 408 instead of the left side wall 406. In such case, for example, the housing space 412 is a space defined by the lever supporter 402, the rear wall 404, the right side wall 408, the bottom wall 410 and the front wall 430. Further, the mechanism opening portion 418 is formed by the end of the lever supporter 402 on the vehicle left side, the end of the rear wall 404 on the vehicle left side, the end of the bottom wall 410 on the vehicle left side, and the end of the front wall 430 on the vehicle left side. At this time, the mechanism opening portion 418 opens and faces in the vehicle left direction. The vehicle left direction corresponds to one direction. Further, the support member extension 830 is connected to a part of the support portion 800 on the vehicle left side. Further, the first housing extension 422 extends in the vehicle left direction from an end of the front wall 430 on the vehicle left side. Further, the second housing extension 426 extends in the vehicle left direction from an end of the rear wall 404 on the vehicle left side. Such a form is also acceptable.

Fifth Embodiment

Figure 14:
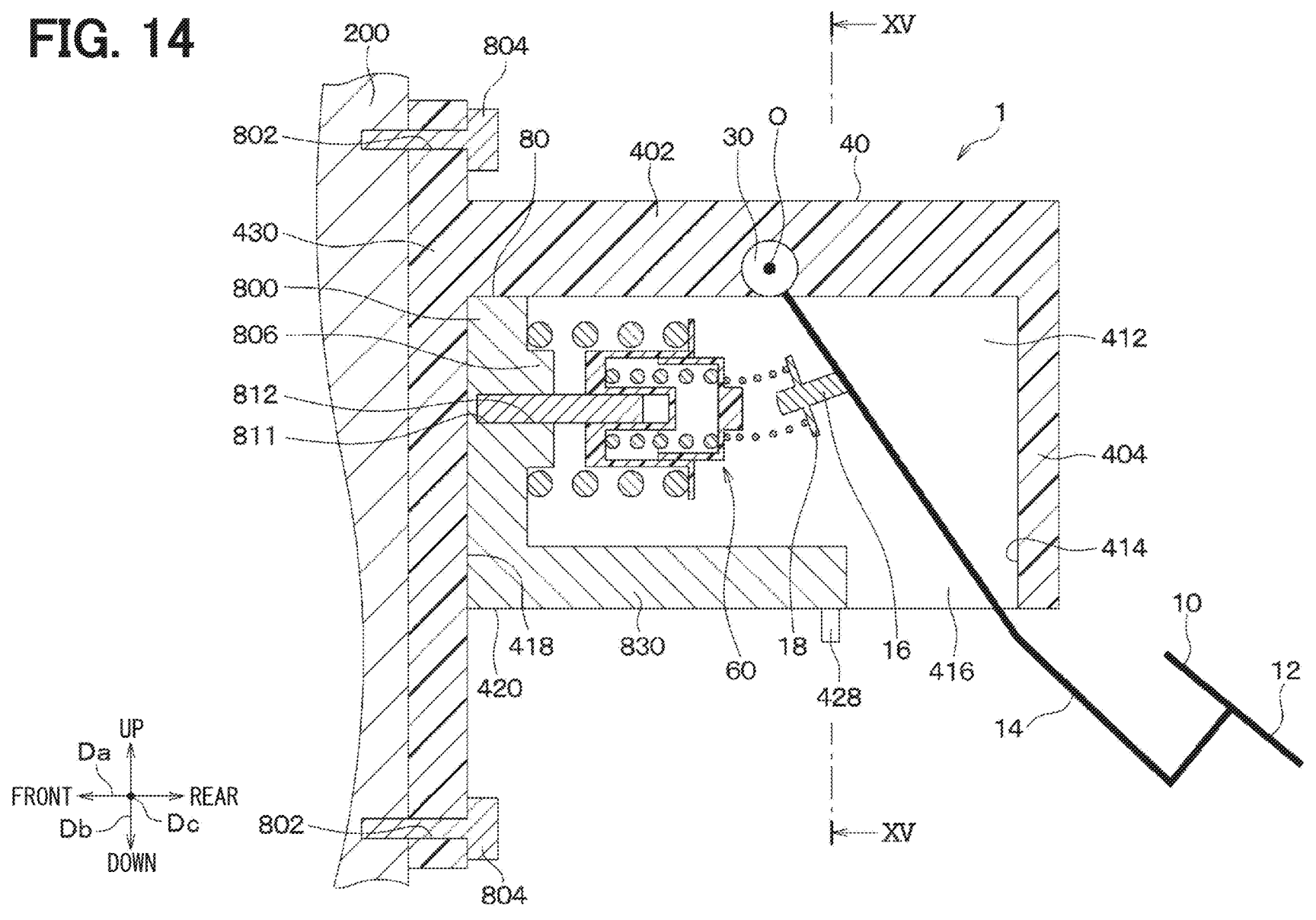
Figure 15:
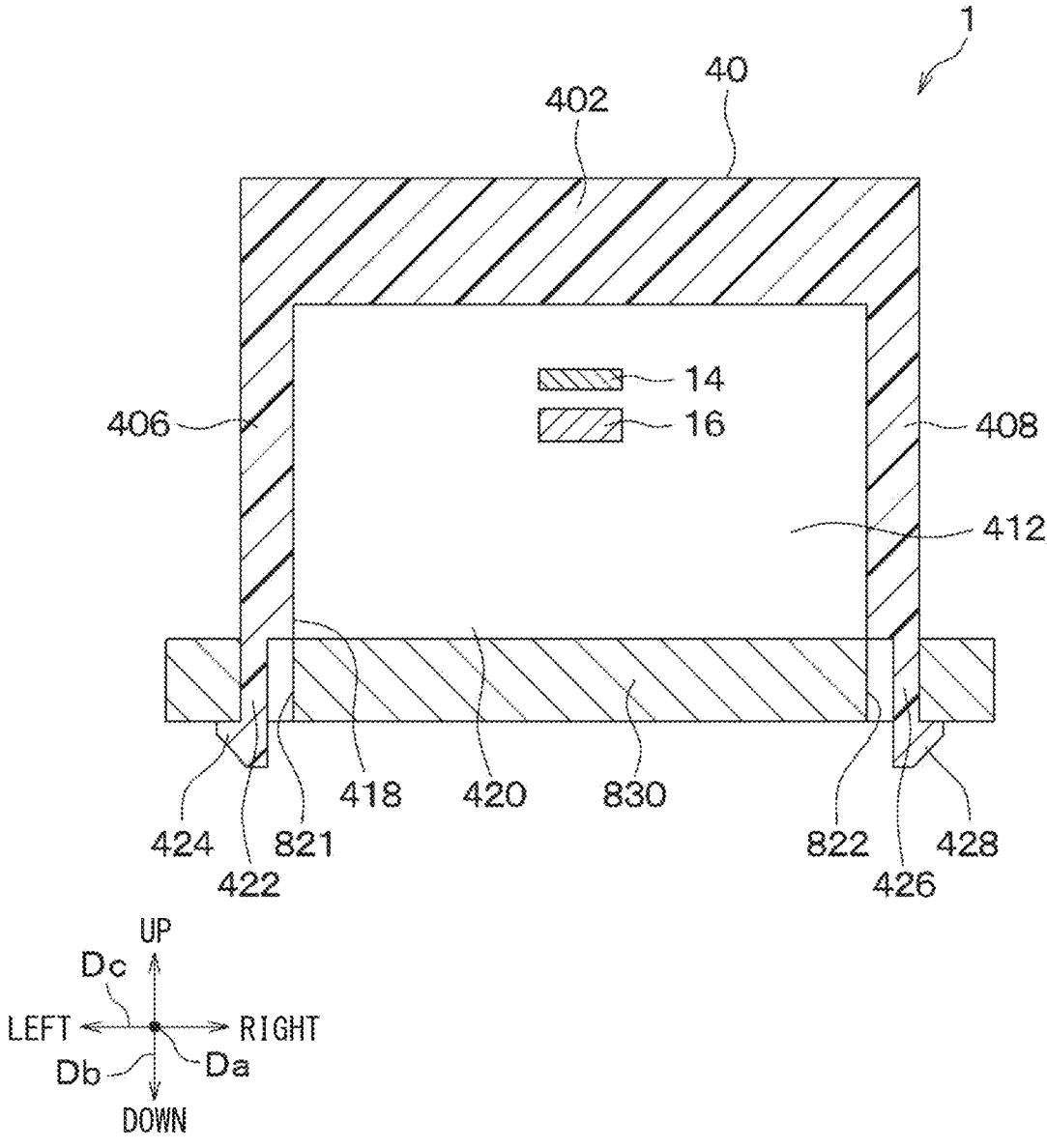
FIG. 15 is a cross-sectional view taken along a line XV-XV in FIG. 14.

In the fifth embodiment, as shown in FIGS. 14 and 15, a housing 40 includes a front wall 430 instead of a bottom wall 410. Also, instead of a support member 80 not having a panel hole 802 and a panel bolt 804, the housing 40 includes the panel hole 802 and the panel bolt 804. Further, the shapes of a housing space 412, a mechanism opening portion 418, and a mechanism opening space 420 are different from those in the first embodiment. Further, the shapes of a first housing extension 422, a first housing claw 424, a second housing extension 426 and a second housing claw 428 are different from those in the first embodiment. Further, the support member 80 includes a support member extension 830. Further, the shapes of a first member hole 821 and a second member hole 822 are different from those in the first embodiment. Other than the above, the same configuration as the first embodiment is adopted.

The front wall 430 is connected to a part of the lever supporter 402 facing the vehicle front, a part of a left side wall 406 facing the vehicle front, and a part of a right side wall 408 facing the vehicle front. Further, a panel hole 802 is formed on the front wall 430. A panel bolt 804 is inserted into the panel hole 802 and the hole on the dash panel 200.

In such manner, the housing 40 is attached to the dash panel 200. The pedal device 1 is thereby attached to the dash panel 200.

The housing space 412 is a space defined by a lever supporter 402, a rear wall 404, the left side wall 406, the right side wall 408 and the front wall 430.

A pedal opening 414 is defined by an end of the rear wall 404 on the vehicle lower side, an end of the left side wall 406 on the vehicle lower side, and an end of the right side wall 408 on the vehicle lower side.

The mechanism opening portion 418 is defined by an end of the left side wall 406 on the vehicle lower side, an end of the right side wall 408 on the vehicle lower side, and a part of the front wall 430 on the vehicle lower side. Therefore, the mechanism opening portion 418 opens and faces in the vehicle downward direction. The vehicle downward direction corresponds to one direction.

The mechanism opening space 420 is formed by the mechanism opening portion 418 and communicates with the housing space 412 in the vehicle up-down direction Db.

The first housing extension 422 is connected to an end of the mechanism opening portion 418 on the vehicle left side, i.e., an end of the left side wall 406 on the vehicle lower side. Further, the first housing extension 422 extends in the vehicle downward direction from an end of the left side wall 406 on the vehicle lower side.

The first housing claw 424 is connected to one side of the first housing extension 422 opposite to the left side wall 406. Further, the first housing claw 424 extends from the first housing extension 422 toward the vehicle left side.

The second housing extension 426 is connected to an end of the mechanism opening portion 418 on the vehicle right side, i.e., an end of the right side wall 408 on the vehicle lower side. Further, the second housing extension 426 extends in the vehicle downward direction from an end of the right side wall 408 on the vehicle lower side.

The second housing claw 428 is connected to the second housing extension 426 on an opposite side to the right side wall 408. Further, the second housing claw 428 extends from the second housing extension 426 towards the vehicle right side.

The support member extension 830 is connected to a part of the support portion 800 on the vehicle lower side. The support member extension 830 is made of metal and has a plate shape extending in the vehicle front-rear direction Da and in the vehicle left-right direction Dc.

Instead of being formed on the support portion 800, the first member hole 821 is formed on the support member extension 830. The first member hole 821 is a hole that extends in the vehicle up-down direction Db. Further, the first housing extension 422 is inserted into the first member hole 821. Further, the first housing claw 424 and the support member extension 830 are in contact with each other. In such manner, the support member extension 830 is connected to the mechanism opening portion 418, and the support member 80 is engaged with the housing 40.

Instead of being formed on the support portion 800, the second member hole 822 is formed on the support member extension 830. The second member hole 822 is a hole that extends in the vehicle up-down direction Db. Further, the second housing extension 426 is inserted into the second member hole 822. Further, the second housing claw 428 and the support member extension 830 are in contact with each other. In such manner, the support member extension 830 is connected to the mechanism opening portion 418, and the support member 80 is engaged with the housing 40.

Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the fifth embodiment is configured as described above. The fifth embodiment also provides the same effects as the first embodiment.

Sixth Embodiment

Figure 16:
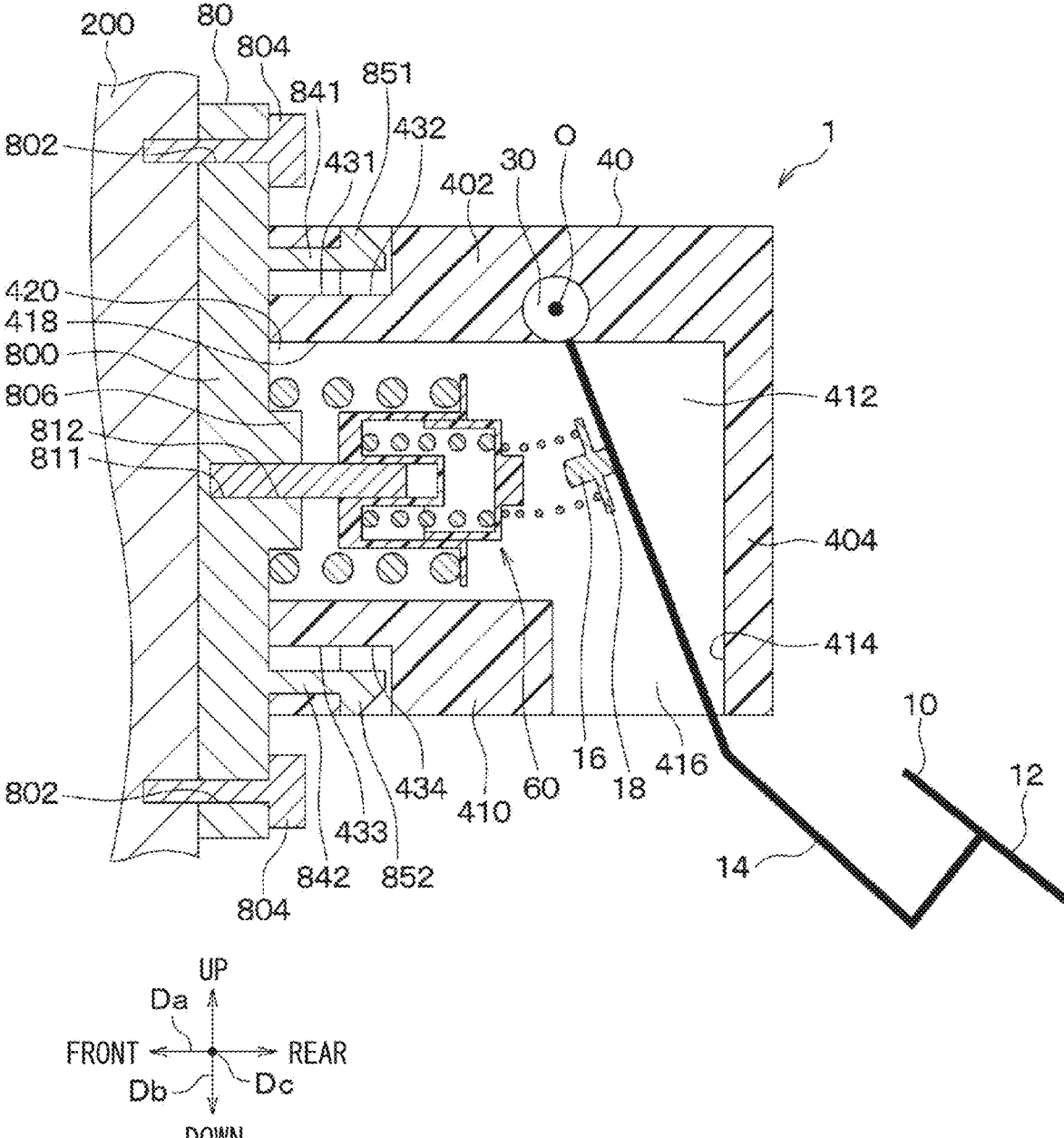
FIG. 16 is a cross-sectional view of a pedal device according to a sixth embodiment.

In the sixth embodiment, as shown in FIG. 16, instead of a first member hole 821 and a second member hole 822, a support member 80 includes a first member extension 841, a first member claw 851, a second member extension 842, and a second member claw 852. Further, a housing 40 does not include a first housing extension 422, a first housing claw 424, a second housing extension 426, and a second housing claw 428. Instead, the housing 40 includes a first housing hole 431, a second housing hole 432, a third housing hole 433 and a fourth housing hole 434. Other than the above, the same configuration as the first embodiment is adopted.

The first member extension 841, the first member claw 851, the second member extension 842, and the second member claw 852 form a snap fit.

Specifically, the first member extension 841 is connected to a part of a support portion 800 on the vehicle upper side. Further, the first member extension 841 extends in the vehicle rear direction from a part of the support portion 800 on the vehicle upper side.

The first member claw 851 is connected to one side of the first member extension 841 opposite to the support portion 800. Further, the first member claw 851 extends from the first member extension 841 in a direction intersecting the direction in which the first member extension 841 extends. For example, the first member claw 851 extends from the first member extension 841 in the vehicle upward direction.

The second member extension 842 is connected to a part of the support portion 800 on the vehicle lower side. Further, the second member extension 842 extends in the vehicle rear direction from a part of the support portion 800 that is on the vehicle lower side.

The second member claw 852 is connected to one side of the second member extension 842 opposite to the support portion 800. Further, the second member claw 852 extends from the second member extension 842 in a direction intersecting the direction in which the second member extension 842 extends. For example, the second member claw 852 extends from the second member extension 842 in the vehicle downward direction.

The first housing hole 431 and the second housing hole 432 are formed on a lever supporter 402. The first housing hole 431 is a hole that extends in the vehicle front-rear direction Da. The second housing hole 432 communicates with the first housing hole 431. Further, the second housing hole 432 is a through hole extending in the vehicle up-down direction Db. It should be noted that the second housing hole 432 is not limited to being a through hole. The second housing hole 432 may be, for example, a bottomed hole.

Here, when the first member claw 851 is inserted into first housing hole 431, the first member extension 841 is elastically deformed. Further, when the support member 80 and the housing 40 are brought closer to each other, the shape of the first member extension 841 returns to its original shape, and the first member extension 841 is inserted into the first housing hole 431. At this time, the first member claw 851 is inserted into the second housing hole 432 and the first member claw 851 and the lever supporter 402 come into contact with each other. In such manner, the support portion 800 and the mechanism opening portion 418 are connected, and the support member 80 and the housing 40 are engaged with each other.

The third housing hole 433 and the fourth housing hole 434 are formed on the bottom wall 410. The third housing hole 433 is a hole that extends in the vehicle front-rear direction Da. The fourth housing hole 434 communicates with the third housing hole 433. Further, the fourth housing hole 434 is a through hole extending in the vehicle up-down direction Db. It should be noted that the fourth housing hole 434 is not limited to being a through hole. The fourth housing hole 434 may be, for example, a bottomed hole.

Further, when the second member claw 852 is inserted into the third housing hole 433, the second member extension 842 is elastically deformed. Further, when the support member 80 and the housing 40 are brought closer to each other, the shape of the second member extension 842 returns to its original shape, and the second member extension 842 is inserted into the third housing hole 433. At this time, the second member claw 852 is inserted into the fourth housing hole 434 and the second member claw 852 comes into contact with the bottom wall 410. In such manner, the support portion 800 and the mechanism opening portion 418 are connected, and the support member 80 and the housing 40 are engaged with each other.

Further, since the support portion 800 and the mechanism opening portion 418 are connected, the support portion 800 closes a mechanism opening space 420. Further, a second elastic member 72 supported by the support portion 800 is inserted into a housing space 412 and the mechanism opening space 420. In such manner, a reaction force generating mechanism 60 is housed in the housing space 412 and is surrounded by the support member 80 and the housing 40.

A pedal device 1 of the sixth embodiment is configured as described above. The sixth embodiment also provides the same effects as the first embodiment. Moreover, the sixth embodiment provides the following effects.

[3-1] The support member 80 has the support portion 800, the first member extension 841, the first member claw 851, the second member extension 842, and the second member claw 852. The first member extension 841 extends from the support portion 800 in the vehicle rear direction. The first member claw 851 is connected to the first member extension 841 and extends from the first member extension 841 in the vehicle upward direction. The second member extension 842 extends from the support portion 800 in the vehicle rear direction. The second member claw 852 is connected to the second member extension 842 and extends from the second member extension 842 in the vehicle downward direction. It should be noted that the first member extension 841 and the second member extension 842 correspond to an extension portion. The first member claw 851 and the second member claw 852 correspond to a claw portion. The rear direction of the vehicle corresponds to the opposite direction to one direction. The vehicle upward direction and the vehicle downward direction correspond to directions intersecting the direction in which the extension portion extends.

Further, the housing 40 also includes the first housing hole 431, the second housing hole 432, the third housing hole 433, and the fourth housing hole 434. The first member extension 841 is inserted into the first housing hole 431. The first member claw 851 is inserted into the second housing hole 432. The second member extension 842 is inserted into the third housing hole 433. The second member claw 852 is inserted into the fourth housing hole 434. Further, the first member claw 851 and the second member claw 852 are in contact with the housing 40, thereby the housing 40 and the support member 80 are engaged with each other. In such manner, it is easy for the housing 40 and the support member 80 to be held together. Here, the first housing hole 431 and the third housing hole 433 correspond to a first space. The second housing hole 432 and the fourth housing hole 434 correspond to a second space.

[3-2] The first member extension 841 is deformed when the first member claw 851 is inserted into the first housing hole 431. Further, the second member extension 842 is deformed when the second member claw 852 is inserted into the second housing hole 432.

In such manner, it is easy to insert the first member extension 841 into the first housing hole 431 with a single action. Further, the second member extension 842 can be easily inserted into the third housing hole 433 with a single action. Therefore, the housing 40 and the support member 80 are easily assembled together.

Further, since it is no longer necessary to fasten the housing 40 and the support member 80 using bolts or the like, the number of parts of the pedal device 1 is reducible. Further, since the number of parts of the pedal system 1 is reducible, the cost of the pedal system 1 is reducible.

Seventh Embodiment

Figure 17:
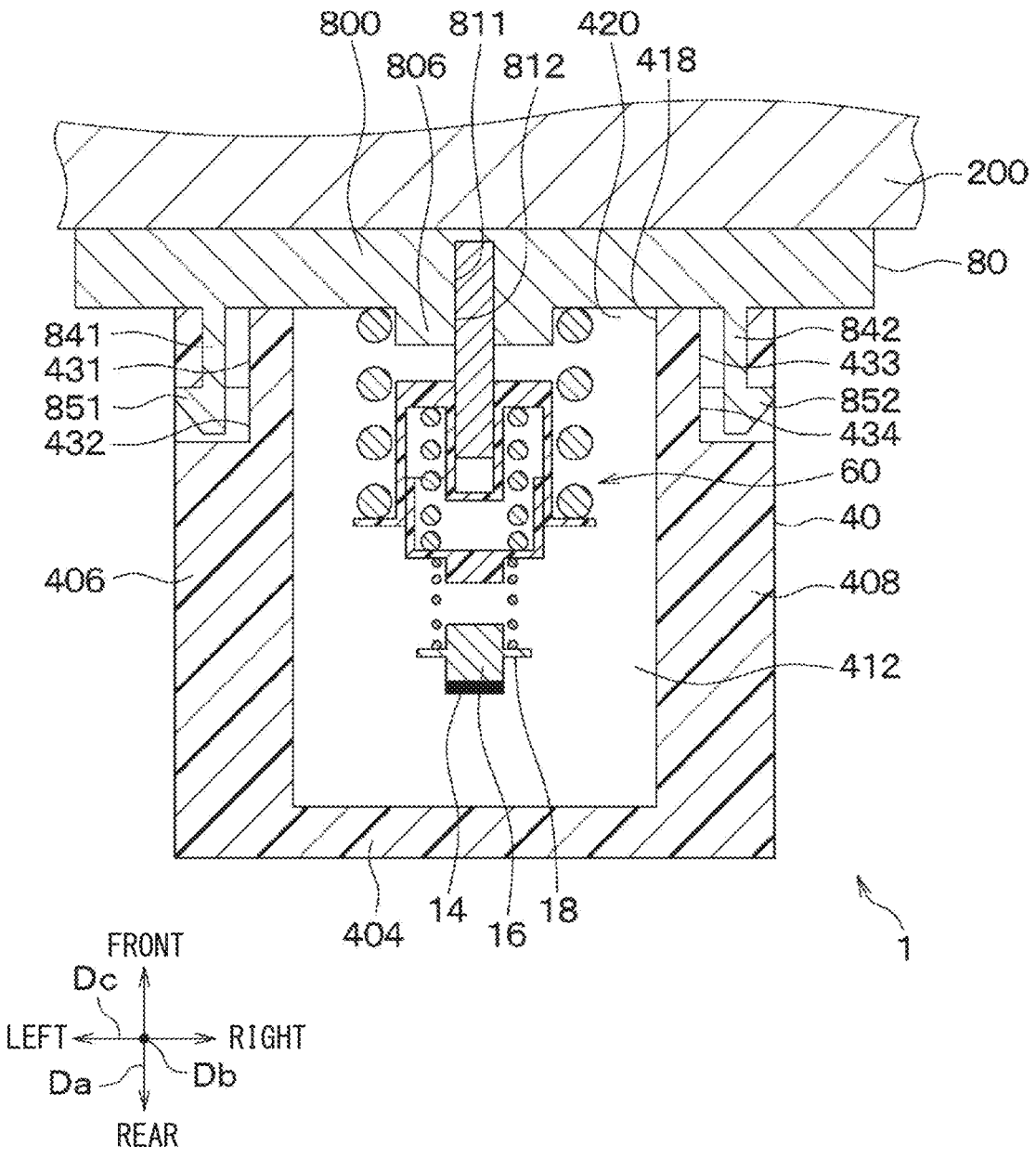
FIG. 17 is a cross-sectional view of a pedal device according to a seventh embodiment.

As shown in FIG. 17, the seventh embodiment differs from the sixth embodiment in the shapes of a first housing hole 431, a second housing hole 432, a third housing hole 433 and a fourth housing hole 434. Further, the shapes of a first member extension 841, a first member claw 851, a second member extension 842, and a second member claw 852 are different from those in the sixth embodiment. Other than the above, the same configuration is adopted as the sixth embodiment.

The first housing hole 431 and the second housing hole 432 are formed on a left side wall 406. Further, the second housing hole 432 extends in the vehicle left-right direction Dc instead of extending in the vehicle up-down direction Db.

The third housing hole 433 and the fourth housing hole 434 are formed on a right side wall 408. Further, the fourth housing hole 434 extends in the vehicle left-right direction Dc instead of extending in the vehicle up-down direction Db.

The first member extension 841 is connected to a part of a support portion 800 on the vehicle left side. The first member extension 841 extends in the vehicle rear direction from a part of the support portion 800 on the vehicle left side. Further, the first member extension 841 is inserted into the first housing hole 431.

The first member claw 851 extends from the first member extension 841 in the vehicle left direction. Further, the first member claw 851 is inserted into the second housing hole 432 and is in contact with the left side wall 406. In such manner, the support portion 800 and the mechanism opening portion 418 are connected, and a support member 80 and the housing 40 are engaged with each other.

The second member extension 842 is connected to a part of the support portion 800 on the vehicle right side. Further, the second member extension 842 extends in the vehicle rear direction from a part of the support portion 800 on the vehicle right side. Further, the second member extension 842 is inserted into the third housing hole 433.

The second member claw 852 extends from the second member extension 842 in the vehicle right direction. Further, the second member claw 852 is inserted into the fourth housing hole 434 and is in contact with the right side wall 408. In such manner, the support portion 800 and the mechanism opening portion 418 are connected, and the support member 80 and the housing 40 are engaged with each other. Further, since the support portion 800 and the mechanism opening portion 418 are connected, the support portion 800 closes a mechanism opening space 420. Further, a second elastic member 72 supported by the support portion 800 is inserted into the housing space 412 and the mechanism opening space 420. In such manner, a reaction force generating mechanism 60 is housed in the housing space 412 and is surrounded by the support member 80 and the housing 40.

A pedal device 1 of the seventh embodiment is configured as described above. The seventh embodiment also provides the same effects as the sixth embodiment.

Eighth Embodiment

Figure 18:
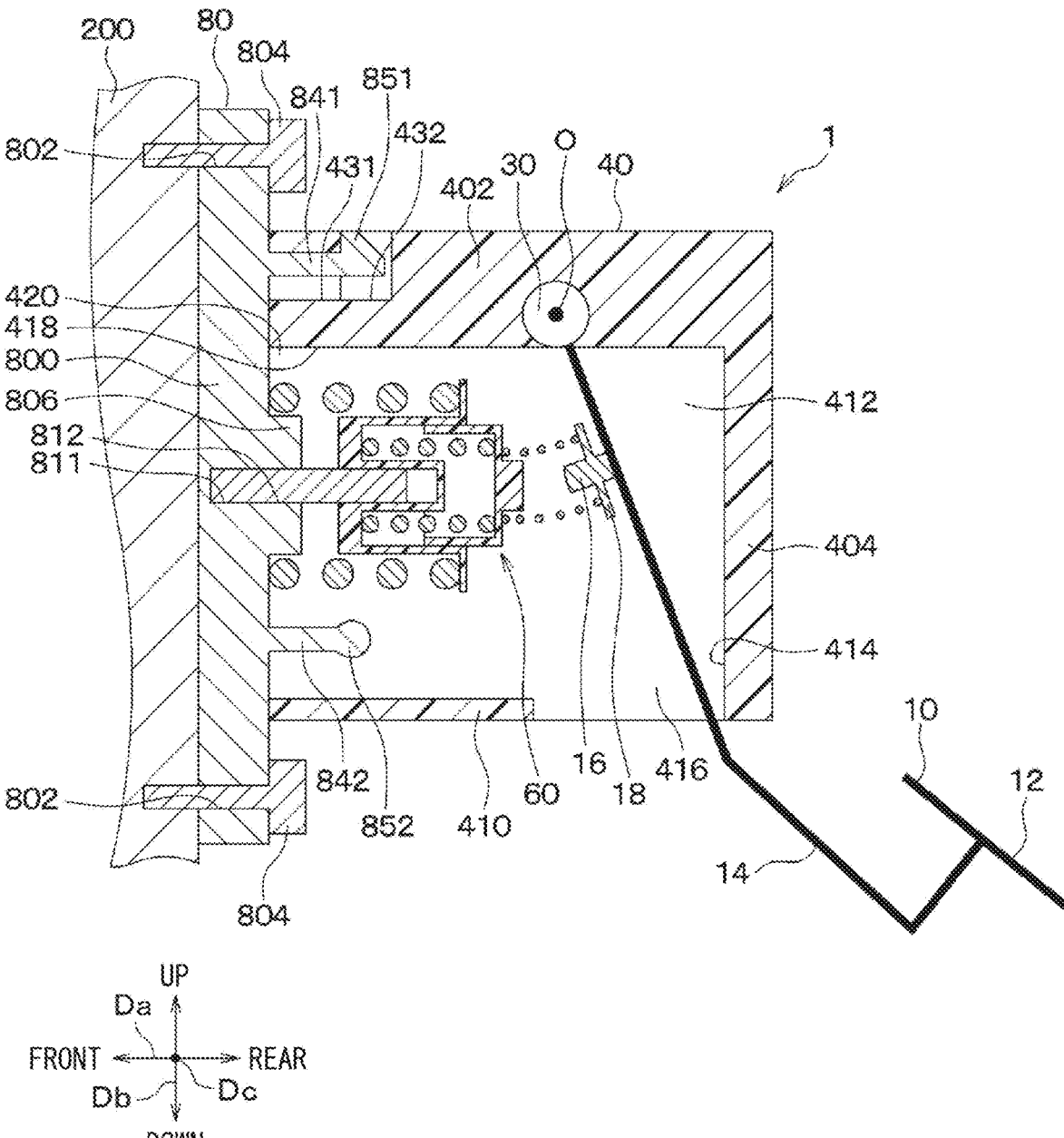
FIG. 18 is a cross-sectional view of a pedal device according to an eighth embodiment.
Figure 19:
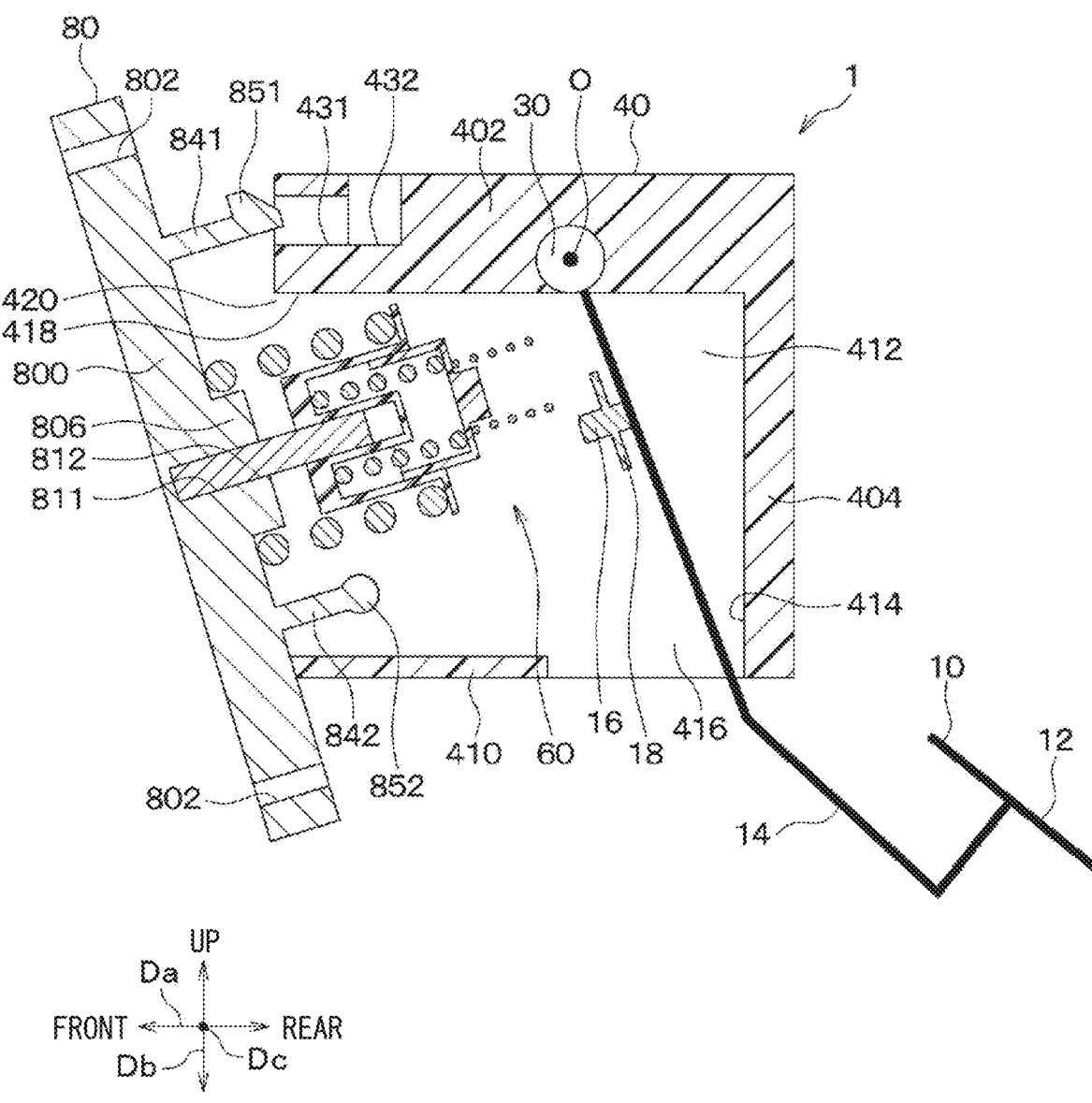
FIG. 19 is a cross-sectional view showing rotation of a support member of the pedal device.

In the eighth embodiment, as shown in FIGS. 18 and 19, a housing 40 does not have a third housing hole 433 and a fourth housing hole 434. Further, the shape of a second member claw 852 differs from that of the sixth embodiment. Other than the above, the same configuration is adopted as the sixth embodiment.

The second member claw 852 is formed in a cylindrical shape having an axis extending in the vehicle left-right direction Dc. Further, a part of the second member claw 852 is inserted into a hole (not shown) formed on a left side wall 406 and a hole (not shown) formed on a right side wall 408. Further, the second member claw 852 is supported by the left side wall 406 and by the right side wall 408 to be rotatable about the axis extending in the vehicle left-right direction Dc.

A pedal device 1 of the eighth embodiment is configured as described above. The eighth embodiment also provides the same effects as the sixth embodiment. Further, the eighth embodiment provides the following effects.

[4] The second member claw 852 is connected to a second member extension 842 and rotates about the axis extending in the vehicle left-right direction Dc. Further, when the second member claw 852 rotates, a support member 80 rotates about the axis of the second member claw 852, thereby causing the first member claw 851 to be inserted into the first member hole 821. It should be noted that the first member extension 841 corresponds to a first extension portion. The first member claw 851 corresponds to a first claw portion. The second member extension 842 corresponds to a second extension portion. The second member claw 852 corresponds to a second claw portion. The vehicle left-right direction Dc corresponds to a direction perpendicular to a one direction.

In such manner, the housing 40 and the support member 80 are assembled together by rotating the support member 80. As a result, the degree of freedom in assembling the housing 40 and the support member 80 is improvable.

Ninth Embodiment

Figure 20:
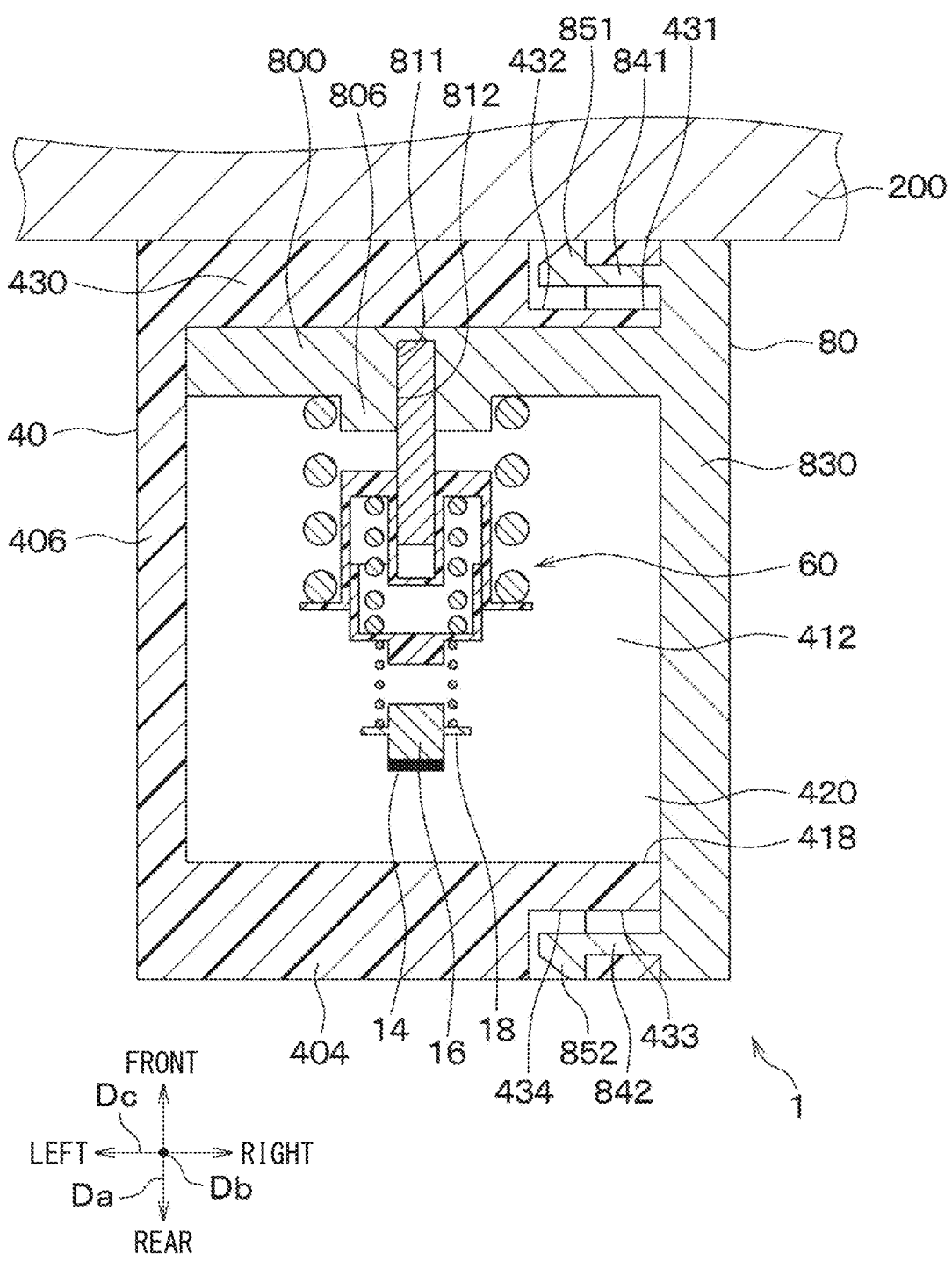
FIG. 20 is a cross-sectional view of a pedal device according to a ninth embodiment.

In the ninth embodiment, as shown in FIG. 20, a housing 40 includes a front wall 430 instead of a right side wall 408. Further, the shapes of a housing space 412, a pedal opening

414, a mechanism opening portion 418 and a mechanism opening space 420 are different from those in the sixth embodiment. Further, a support member 80 further includes a support member extension 830. Further, the shapes of a first housing hole 431, a second housing hole 432, a third housing hole 433 and a fourth housing hole 434 are different from those in the sixth embodiment. Further, the shapes of a first member extension 841, a first member claw 851, a second member extension 842, and a second member claw 852 are different from those in the sixth embodiment. Other than the above, the same configuration is adopted as the sixth embodiment.

The front wall 430 is connected to a part of a lever supporter 402 facing the vehicle front, a part of a left side wall 406 facing the vehicle front, and a part of a bottom wall 410 facing the vehicle front. It should be noted that a panel hole 802 is formed on the front wall 430, and the front wall 430 is positioned further forward of a support portion 800 in the vehicle. Therefore, the support portion 800 does not have the panel hole 802 formed thereon. Further, a panel bolt 804 is inserted into the panel hole 802 on the front wall 430 and a hole on a dash panel 200. In such manner, the housing 40 is attached to the dash panel 200. A pedal device 1 is thereby attached to the dash panel 200.

The housing space 412 is a space defined by the lever supporter 402, a rear wall 404, the left side wall 406, the bottom wall 410 and the front wall 430.

The pedal opening 414 is defined by an end of the rear wall 404 on the vehicle lower side, an end of the left side wall 406 on the vehicle lower side, and an end of the bottom wall 410 on the vehicle rear side.

The mechanism opening portion 418 is formed by an end of the lever supporter 402 on the vehicle right side, an end of the rear wall 404 on the vehicle right side, an end of the bottom wall 410 on the vehicle right side, and an end of the front wall 430 on the vehicle right side. Therefore, the mechanism opening portion 418 opens and faces in the vehicle right direction. Here, the vehicle right direction corresponds to one direction.

The mechanism opening space 420 is formed by the mechanism opening portion 418 and communicates with the housing space 412 in the vehicle left-right direction Dc.

The support member extension 830 is connected to a part of the support portion 800 on the vehicle right side. The support member extension 830 is made of metal and has a plate shape extending in the vehicle front-rear direction Da and in the vehicle up-down direction Db.

The first housing hole 431 and the second housing hole 432 are formed on a part of the front wall 430 on the vehicle right side. The first housing hole 431 extends in the vehicle left-right direction Dc. The second housing hole 432 communicates with the first housing hole 431 and extends in the vehicle front-rear direction Da.

The third housing hole 433 and the fourth housing hole 434 are formed on a part of the rear wall 404 on the vehicle right side. The third housing hole 433 extends in the vehicle left-right direction Dc. The fourth housing hole 434 communicates with the third housing hole 433 and extends in the vehicle front-rear direction Da.

The first member extension 841 is connected to a part of the support member extension 830 on the vehicle front side. Further, the first member extension 841 extends in the vehicle left direction from a part of the support member extension 830 on the vehicle front side and. Further, the first member extension 841 is inserted into the first housing hole 431. The vehicle left direction corresponds to an opposite direction opposite to the one direction.

The first member claw 851 extends from the first member extension 841 in the vehicle front direction. Further, the first member claw 851 is inserted into the second housing hole 432 and is in contact with the front wall 430. In such manner, the support member extension 830 is connected to the mechanism opening portion 418, and the support member 80 is engaged with the housing 40.

The second member extension 842 is connected to a part of the support member extension 830 on the vehicle rear side. Further, the second member extension 842 extends in the vehicle left direction from a part of the support member extension 830 on the vehicle rear side. Further, the second member extension 842 is inserted into the third housing hole 433.

The second member claw 852 extends from the second member extension 842 in the vehicle rear direction. Further, the second member claw 852 is inserted into the fourth housing hole 434 and is in contact with the rear wall 404. In such manner, the support member extension 830 and the mechanism opening portion 418 are connected, and the support member 80 and the housing 40 are engaged. Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the ninth embodiment is configured as described above. The ninth embodiment also provides the same effects as the sixth embodiment. In the ninth embodiment, the housing 40 may include the right side wall 408 instead of the left side wall 406. In such case, for example, the housing space 412 is a space defined by the lever supporter 402, the rear wall 404, the right side wall 408, the bottom wall 410 and the front wall 430. Further, the mechanism opening portion 418 is formed by an end of the lever supporter 402 on the vehicle left side, an end of the rear wall 404 on the vehicle left side, an end of the bottom wall 410 on the vehicle left side, and an end of the front wall 430 on the vehicle left side. At this time, the mechanism opening portion 418 opens and faces in the vehicle left direction. The vehicle left direction corresponds to one direction. Further, the support member extension 830 is connected to a part of the support portion 800 on the vehicle left side. Further, the first housing hole 431 and the second housing hole 432 are formed on a part of the front wall 430 on the vehicle left side. Further, the third housing hole 433 and the fourth housing hole 434 are formed on a part of the rear wall 404 on the vehicle left side. Further, the first member extension 841 extends in the vehicle right direction from a part of the support member extension 830 on the vehicle front side. Further, the second member extension 842 extends in the vehicle right direction from a part of the support member extension 830 on the vehicle rear side. The vehicle right direction corresponds to an opposite direction opposite to the one direction. Such a modification is also acceptable.

Tenth Embodiment

Figure 21:
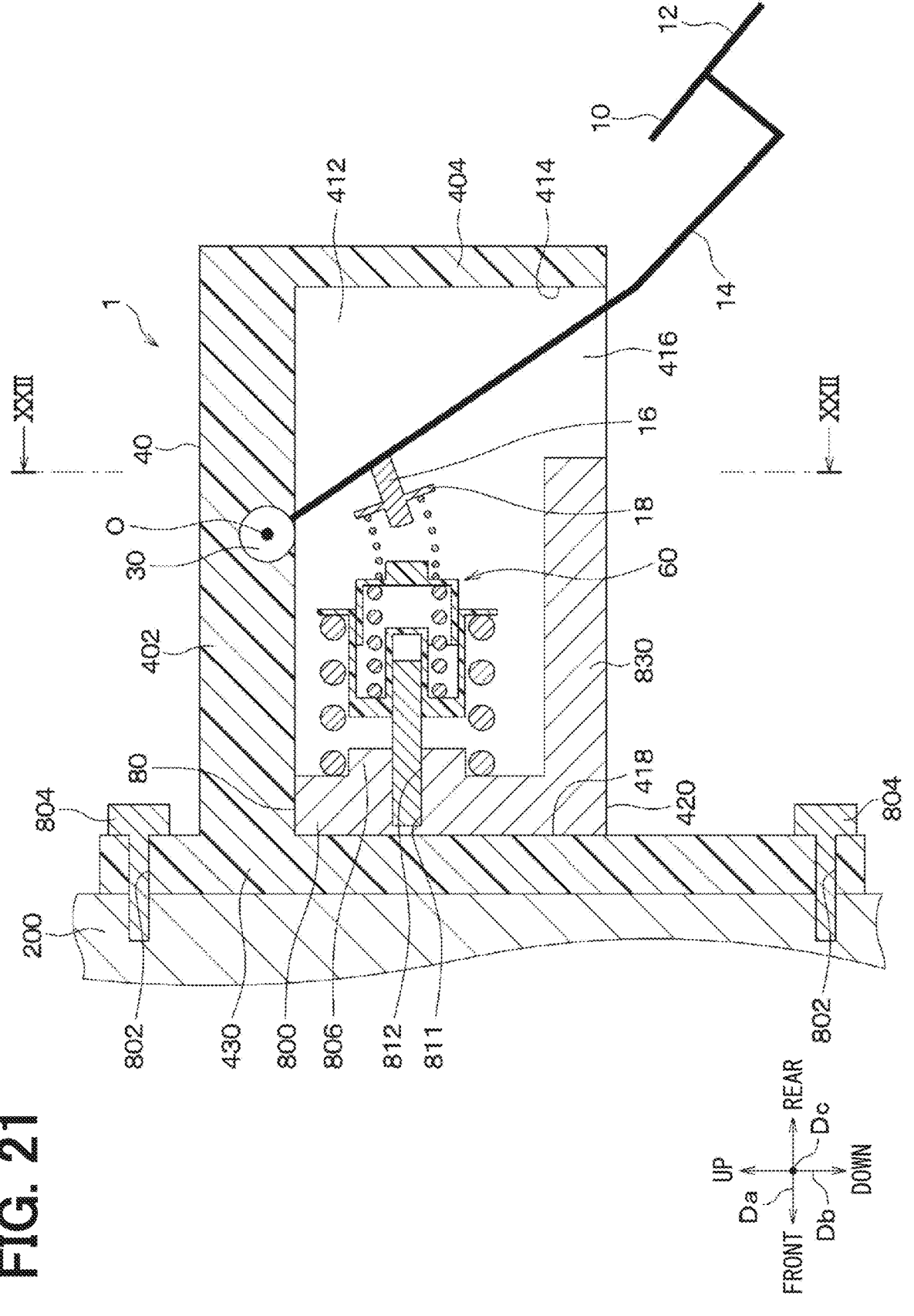
FIG. 21 is a cross-sectional view of a pedal device according to a tenth embodiment.
Figure 22:
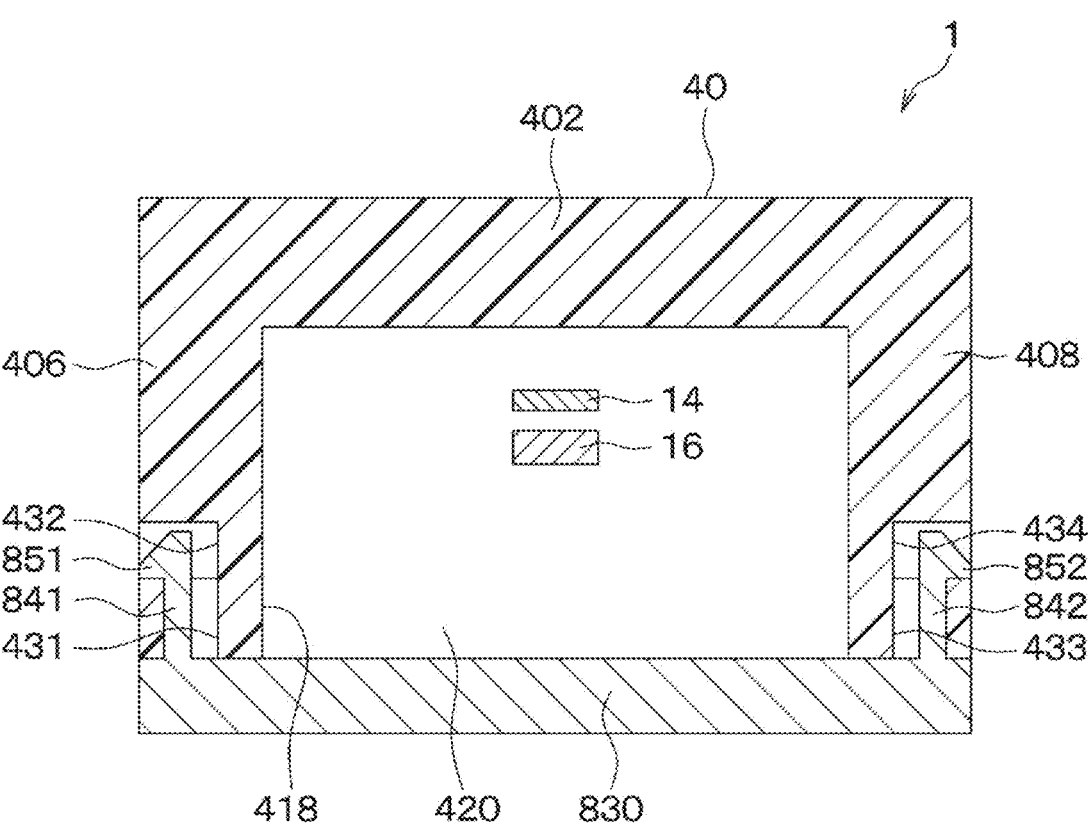
FIG. 22 is a cross-sectional view taken along a line XXII-XXII in FIG. 21.
Figure 22:
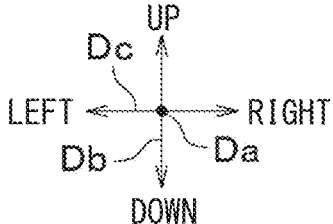

In the tenth embodiment, as shown in FIGS. 21 and 22, a housing 40 includes a front wall 430 instead of a bottom wall 410. Also, instead of a support member 80 not having a panel hole 802 and a panel bolt 804, the housing 40 includes the panel hole 802 and the panel bolt 804. Further, the shapes of a housing space 412, a mechanism opening portion 418, and a mechanism opening space 420 are different from those in the sixth embodiment. Further, the support member 80 further includes a support member extension 830. Further, the shapes of a first housing hole 431, a second housing hole 432, a third housing hole 433 and a fourth housing hole 434 are different from those in the sixth embodiment. Further, the shapes of a first member extension 841, a first member claw 851, a second member extension 842, and a second member claw 852 are different from those in the sixth embodiment. Other than the above, the same configuration is adopted as the sixth embodiment.

The front wall 430 is connected to a part of a lever supporter 402 facing the vehicle front, a part of a left side wall 406 facing the vehicle front, and a part of a right side wall 408 facing the vehicle front. Further, the panel hole 802 is formed on the front wall 430. The panel bolt 804 is inserted into the panel hole 802 and a hole on a dash panel 200. In such manner, the housing 40 is attached to the dash panel 200. A pedal device 1 is thereby attached to the dash panel 200.

The housing space 412 is a space defined by the lever supporter 402, a rear wall 404, the left side wall 406, the right side wall 408 and the front wall 430.

A pedal opening 414 is defined by an end of the rear wall 404 on the vehicle lower side, an end of the left side wall 406 on the vehicle lower side, and an end of the right side wall 408 on the vehicle lower side.

The mechanism opening portion 418 is defined by an end of the left side wall 406 on the vehicle lower side, an end of the right side wall 408 on the vehicle lower side, and a part of the front wall 430 on the vehicle lower side. Therefore, the mechanism opening portion 418 opens and faces in the vehicle downward direction. The vehicle downward direction corresponds to one direction.

The mechanism opening space 420 is formed by the mechanism opening portion 418 and communicates with the housing space 412 in the vehicle up-down direction Db.

The support member extension 830 is connected to a part of a support portion 800 on the vehicle lower side. The support member extension 830 is made of metal and has a plate shape extending in the vehicle front-rear direction Da and in the vehicle left-right direction Dc.

The first housing hole 431 and the second housing hole 432 are formed on a part of the left side wall 406 on the vehicle lower side. The first housing hole 431 extends in the vehicle up-down direction Db. The second housing hole 432 communicates with the first housing hole 431 and extends in the vehicle left-right direction Dc.

The third housing hole 433 and the fourth housing hole 434 are formed on a part of the right side wall 408 that is on the vehicle lower side. The third housing hole 433 extends in the vehicle up-down direction Db. The fourth housing hole 434 communicates with the third housing hole 433 and extends in the vehicle left-right direction Dc.

The first member extension 841 is connected to a part of the support member extension 830 on the vehicle left side. Further, the first member extension 841 extends in the vehicle upward direction from a part of the support member extension 830 on the vehicle left side. Further, the first member extension 841 is inserted into the first housing hole 431. The vehicle upward direction corresponds to an opposite direction opposite to the one direction.

The first member claw 851 extends from the first member extension 841 in the vehicle left direction. Further, the first member claw 851 is inserted into the second housing hole 432 and is in contact with the left side wall 406. In such manner, the support member extension 830 is connected to the mechanism opening portion 418, and the support member 80 is engaged with the housing 40.

The second member extension 842 is connected to a part of the support member extension 830 on the vehicle right side. Further, the second member extension 842 extends in the vehicle upward direction from a part of the support member extension 830 on the vehicle right side. Further, the second member extension 842 is inserted into the third housing hole 433.

The second member claw 852 extends from the second member extension 842 in the vehicle right direction. Further, the second member claw 852 is inserted into the fourth housing hole 434 and is in contact with the right side wall 408. In such manner, the support portion 800 and the mechanism opening portion 418 are connected, and the support member 80 and the housing 40 are engaged with each other. Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the tenth embodiment is configured as described above. The tenth embodiment also provides the same effects as the sixth embodiment.

Eleventh Embodiment

Figure 23:
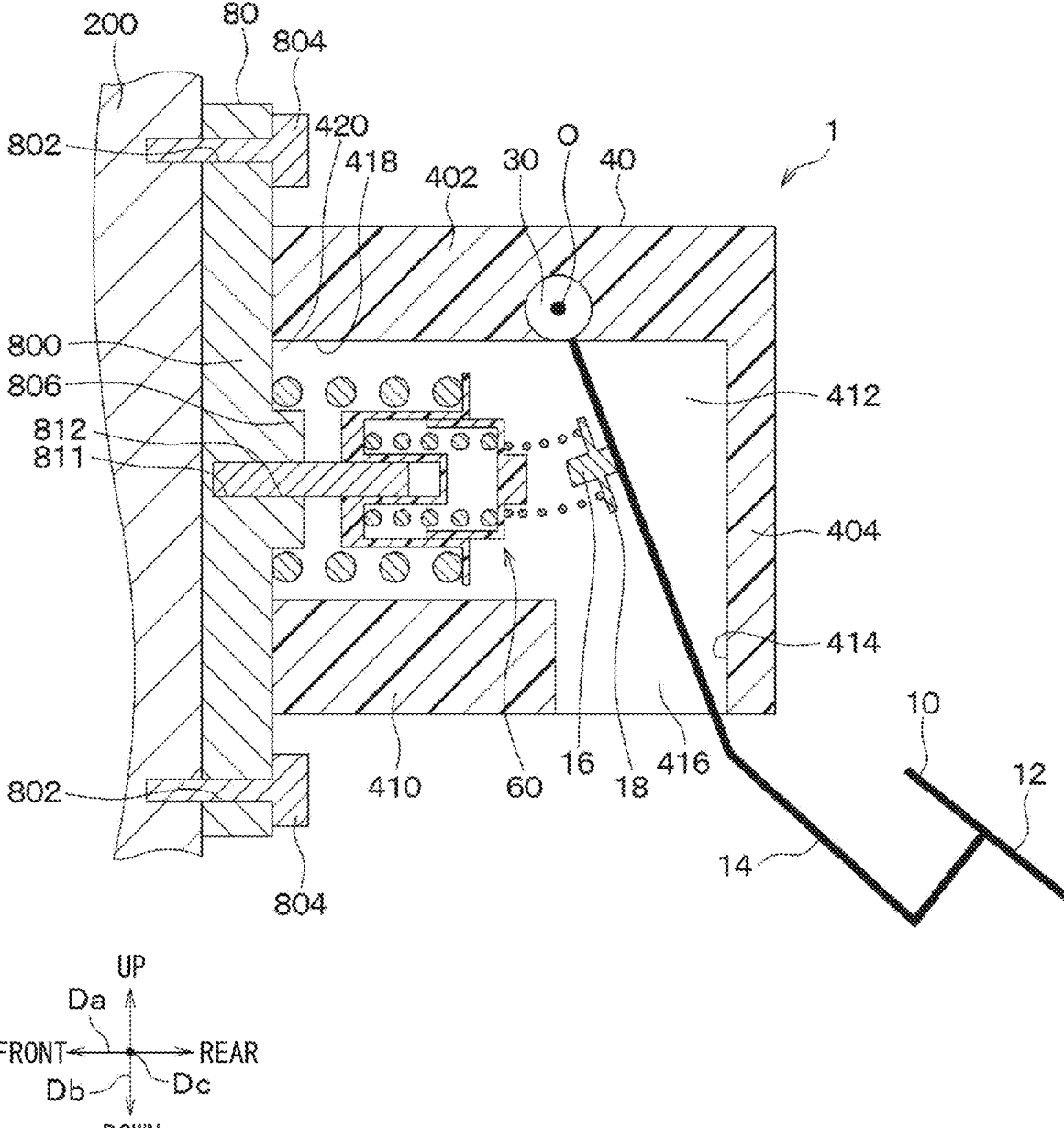
FIG. 23 is a cross-sectional view of a pedal device according to an eleventh embodiment.

In the eleventh embodiment, as shown in FIG. 23, a housing 40 does not include a first housing extension 422, a first housing claw 424, a second housing extension 426, and a second housing claw 428. Further, a support member 80 does not include a first member hole 821 and a second member hole 822. Other than the above, the same configuration as the first embodiment is adopted.

In the eleventh embodiment, a support portion 800 and a mechanism opening portion 418 are connected in the vehicle front-rear direction Da by adhesion, welding, or the like. Specifically, the support portion 800 is connected in the vehicle front-rear direction Da to an end of a lever supporter 402 facing the vehicle front, an end of a left side wall 406 facing the vehicle front, an end of a right side wall 408 facing the vehicle front, and an end of a bottom wall 410 facing the vehicle front by adhesive bonding, welding, or the like. Therefore, the support portion 800 closes a mechanism opening space 420. Further, a second elastic member 72 supported by the support portion 800 is inserted into a housing space 412 and the mechanism opening space 420. In such manner, a reaction force generating mechanism 60 is housed in the housing space 412 and is surrounded by the support member 80 and the housing 40.

A pedal device 1 of the eleventh embodiment is configured as described above. The eleventh embodiment also provides the same effects as the first embodiment.

Twelfth Embodiment

Figure 24:
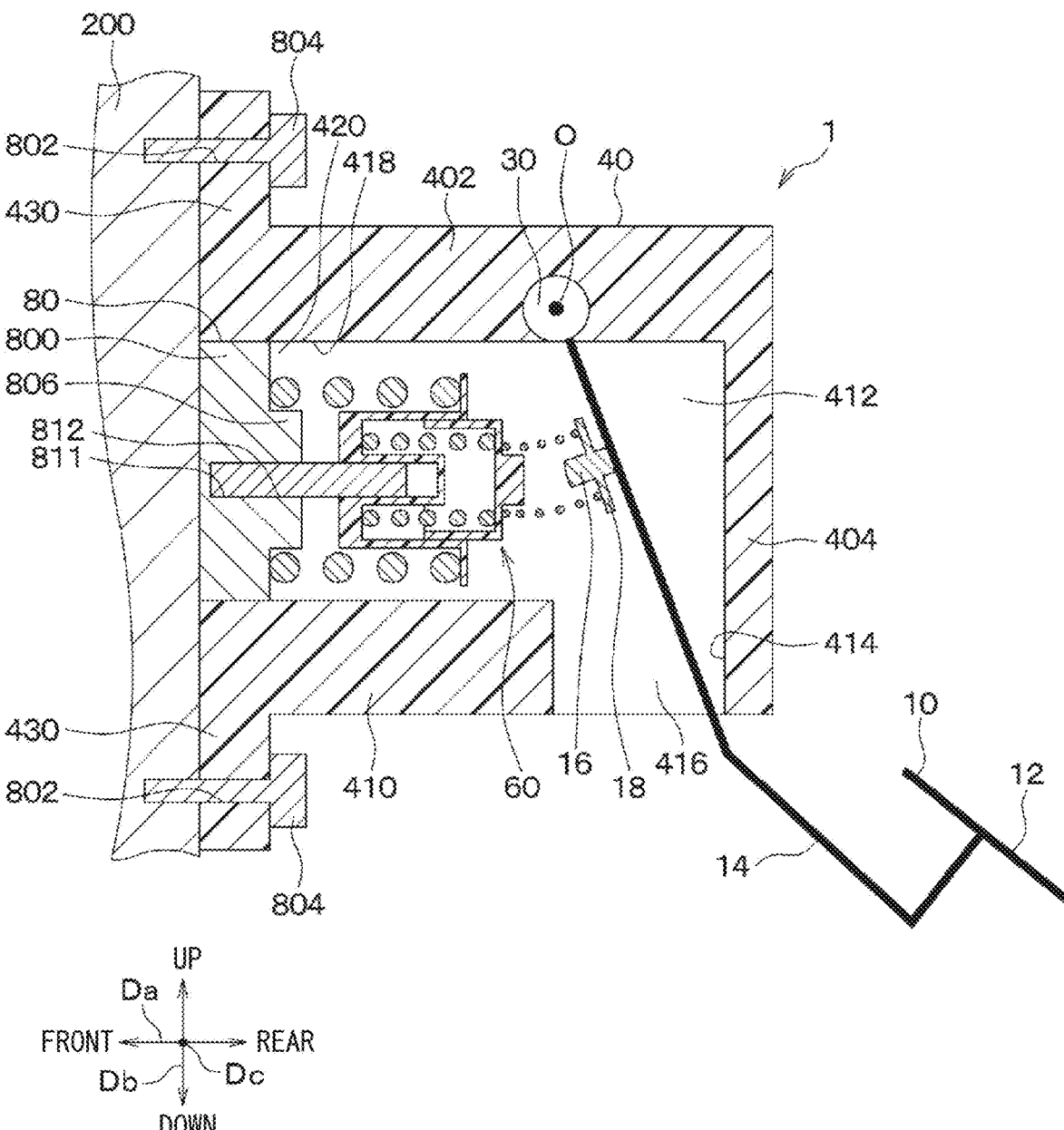
FIG. 24 is a cross-sectional view of a pedal device according to a twelfth embodiment.

In the twelfth embodiment, as shown in FIG. 24, a housing 40 includes a front wall 430, a panel hole 802, and a panel bolt 804. A support member 80 does not include the panel hole 802 and the panel bolt 804. Other than the above, the same configuration is adopted as the eleventh embodiment.

In the twelfth embodiment, a support portion 800 is inserted into a mechanism opening space 420 by pressfitting or the like. In such manner, the support portion 800 and the mechanism opening portion 418 are connected in a direction perpendicular to the vehicle front-rear direction Da. Specifically, the support portion 800 is connected to an end of a lever supporter 402 on the vehicle front side and an end of a bottom wall 410 on the vehicle front side in the vehicle up-down direction Db. Further, the support portion 800 is connected to an end of a left side wall 406 on the vehicle front side and an end of a right side wall 408 on the vehicle front side in the vehicle left-right direction Dc. Therefore, the support portion 800 closes the mechanism opening space 420. Further, a second elastic member 72 supported by the support portion 800 is inserted into a housing space 412. In such manner, a reaction force generating mechanism 60 is housed in the housing space 412 and is surrounded by the support member 80 and the housing 40.

The front wall 430 is connected to an end of a lever supporter 402 on the vehicle front side. Further, the front wall 430 extends in the vehicle upward direction from the end of the lever supporter 402 on the vehicle front side. Further, the front wall 430 is connected to an end of the bottom wall 410 on the vehicle front side. Further, the front wall 430 extends downward from the end of the bottom wall 410 on the vehicle front side.

The panel hole 802 is formed on the front wall 430. Further, the panel bolt 804 is inserted into the panel hole 802 and into a hole on a dash panel 200. In such manner, the housing 40 is attached to the dash panel 200. A pedal device 1 is thereby attached to the dash panel 200.

The pedal device 1 of the twelfth embodiment is configured as described above. The twelfth embodiment also provides the same effects as the eleventh embodiment.

Thirteenth Embodiment

Figure 25:
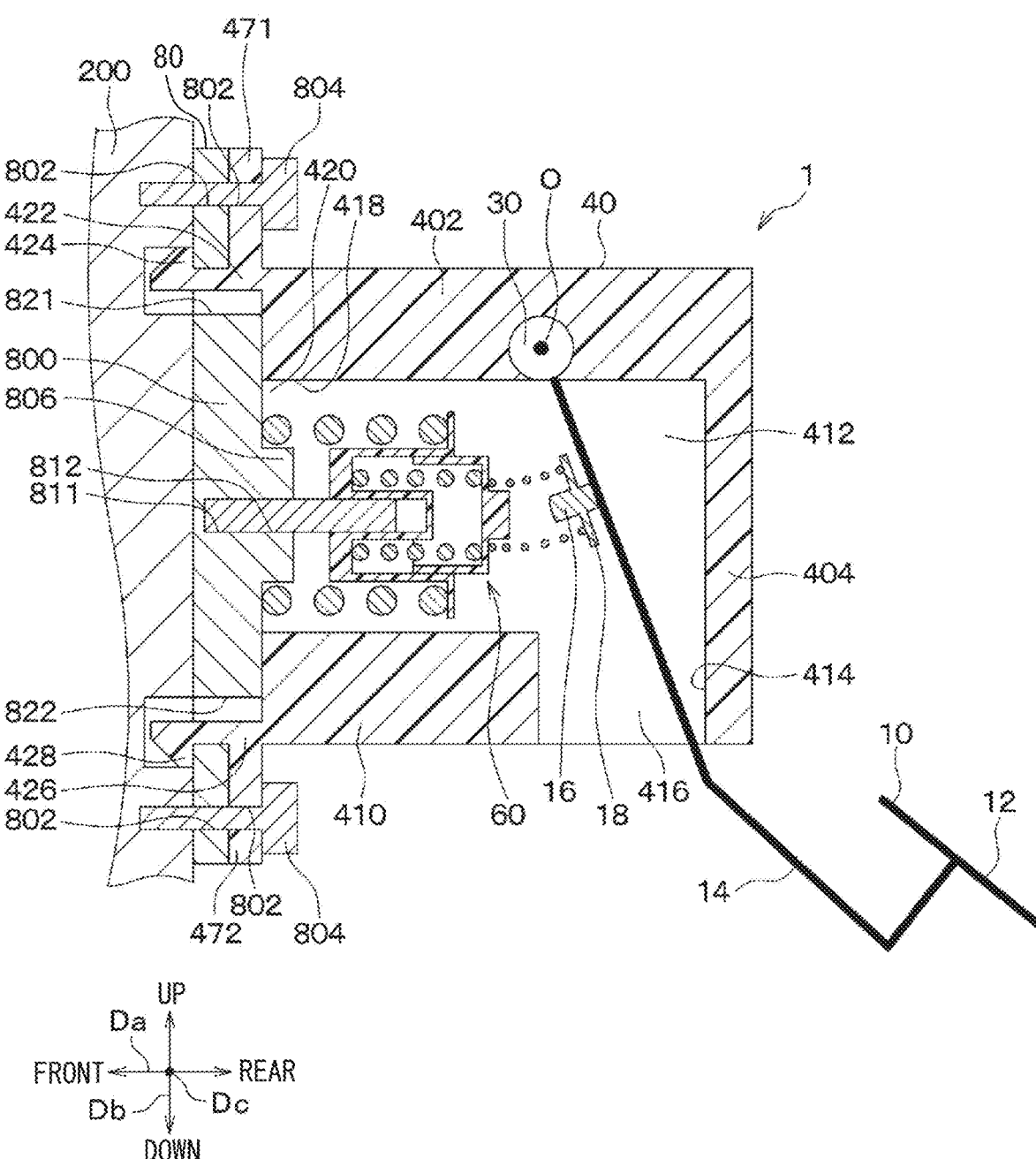
FIG. 25 is a cross-sectional view of a pedal device according to a thirteenth embodiment.

In the thirteenth embodiment, as shown in FIG. 25, a housing 40 further includes a first front wall 471, a second front wall 472 and a panel hole 802. Further, the shape of the support member 80 differs from that of the first embodiment. Other than the above, the same configuration as the first embodiment is adopted.

The first front wall 471 extends from a first housing extension 422 in the vehicle upward direction. Further, a step having a shape corresponding to the first front wall 471 is formed on a part of a support portion 800 on the vehicle upper side. In such manner, the support portion 800 and the first front wall 471 are in contact with each other in the vehicle front-rear direction Da.

The second front wall 472 extends from a second housing extension 426 in the vehicle downward direction. Further, a step having a shape corresponding to the second front wall 472 is formed on a part of the support portion 800 on the vehicle lower side. Therefore, the support portion 800 and the second front wall 472 are in contact with each other in the vehicle front-rear direction Da.

The panel holes 802 of the housing 40 are formed on the first front wall 471 and the second front wall 472 at positions corresponding to the panel holes 802 of the support member 80. Therefore, the panel hole 802 of the housing 40 and the panel hole 802 of the support member 80 communicate with each other. Further, a panel bolt 804 is inserted into the panel hole 802 on the housing 40, the panel hole 802 on support member 80, and a hole on a dash panel 200. In such manner, the housing 40 and the support member 80 are fixed together, and the support member 80 is attached to the dash panel 200. A pedal device 1 is thereby attached to the dash panel 200.

The pedal device 1 of the thirteenth embodiment is configured as described above. The thirteenth embodiment also provides the same effects as the first embodiment.

Fourteenth Embodiment

Figure 26:
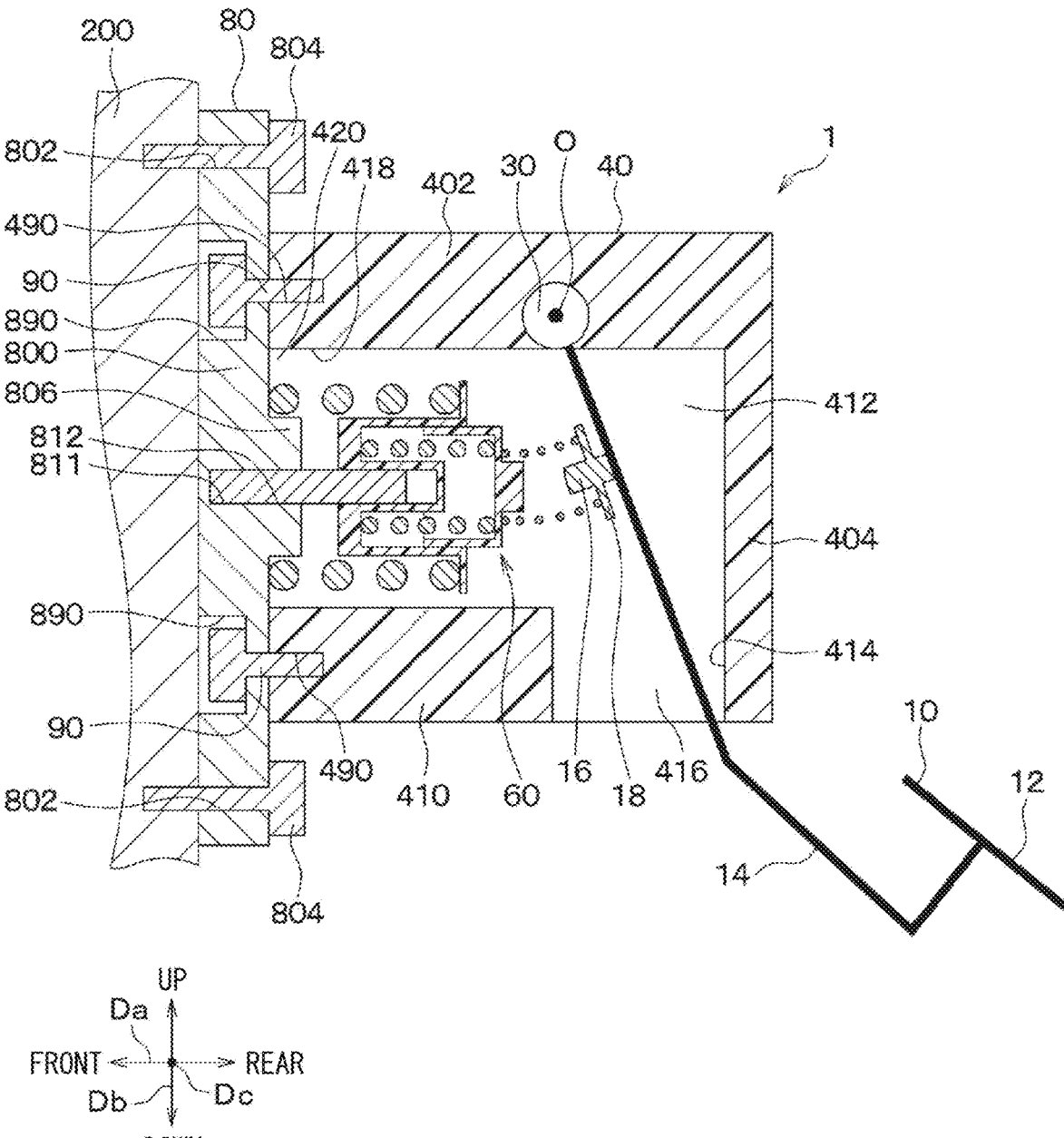
FIG. 26 is a cross-sectional view of a pedal device according to a fourteenth embodiment.

In the fourteenth embodiment, as shown in FIG. 26, a housing 40 further includes a housing fixing hole 490. Moreover, a support member 80 further includes a member fixing hole 890. A pedal device 1 further includes a fixing member 90. Further, a support portion 800 and a mechanism opening portion 418 are not bonded or welded to each other. Other than the above, the same configuration is adopted as the eleventh embodiment.

The housing fixing hole 490 is formed on the mechanism opening portion 418. Specifically, the housing fixing hole 490 is formed on an end of a lever supporter 402 on the vehicle front side and on an end of a bottom wall 410 on the vehicle front side. Further, the housing fixing hole 490 extends in the vehicle front-rear direction Da.

The member fixing hole 890 is formed on the support portion 800 at positions in the vehicle upper part and the vehicle lower part. Further, the member fixing hole 890 is formed at positions corresponding to the housing fixing hole 490. Therefore, the member fixing hole 890 communicates with the housing fixing hole 490.

The fixing member 90 is a bolt or the like, and is inserted into the housing fixing hole 490 and the member fixing hole 890. In such manner, the support portion 800 is connected to the mechanism opening portion 418 and the housing 40 is fixed to the support member 80. Further, since the support portion 800 and the mechanism opening portion 418 are connected, the support portion 800 closes a mechanism opening space 420. Further, a second elastic member 72 supported by the support portion 800 is inserted into a housing space 412 and the mechanism opening space 420. In such manner, a reaction force generating mechanism 60 is housed in the housing space 412 and is surrounded by the support member 80 and the housing 40. In order to prevent the fixing member 90 from contacting a dash panel 200, a head of the fixing member 90 and a part of a threaded portion of the fixing member 90 are inserted into the member fixing hole 890. Further, a part of the threaded portion of the fixing member 90 is inserted into the housing fixing hole 490.

The pedal device 1 of the fourteenth embodiment is configured as described above. The fourteenth embodiment also provides the same effects as the eleventh embodiment. Further, the fourteenth embodiment provides the effects described below.

[5] The housing 40 further includes the housing fixing hole 490. For example, the housing fixing hole 490 is formed on the mechanism opening portion 418. The support member 80 further includes the member fixing hole 890. The member fixing hole 890 communicates with the housing fixing hole 490. Further, the pedal device 1 further includes the fixing member 90. The fixing member 90 is inserted into the housing fixing hole 490 and the member fixing hole 890 to fix the housing 40 and the support member 80 together.

In such manner, a holding force between the housing 40 and the support member 80 is increased as compared to a situation where the housing 40 and the support member 80 are held together by a snap fit or the like. Therefore, the support member 80 is less likely to come off from the housing 40 as compared to the situation where the housing 40 and the support member 80 are held together by a snap fit or the like.

Fifteenth Embodiment

Figure 27:
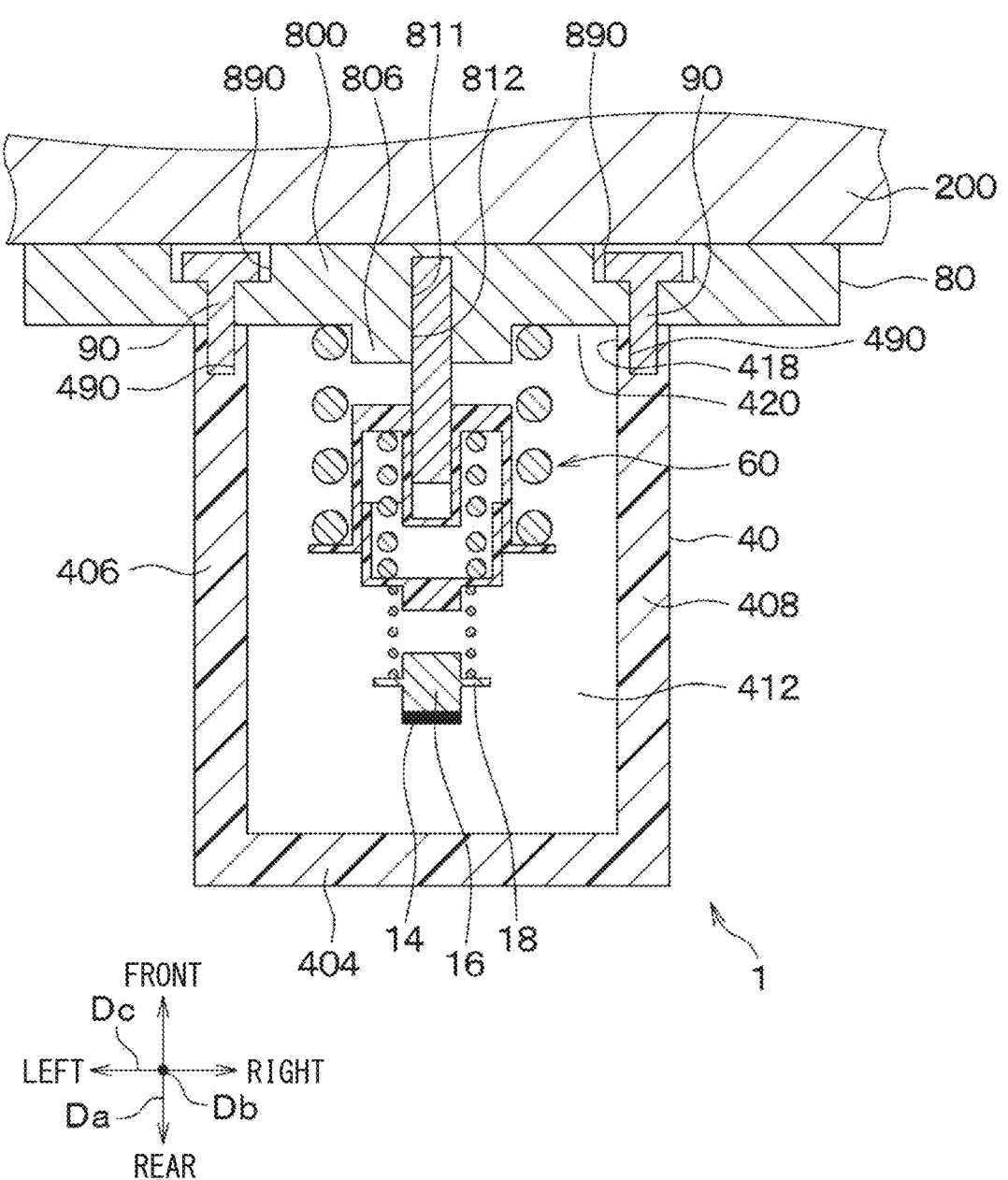
FIG. 27 is a cross-sectional view of a pedal device according to a fifteenth embodiment.

In the fifteenth embodiment, as shown in FIG. 27, positions of a housing fixing hole 490, a member fixing hole 890 and a fixing member 90 are different from those in the fourteenth embodiment. Other than the above, the same configuration is adopted as the fourteenth embodiment.

The housing fixing hole 490 is formed on an end of a left side wall 406 facing the vehicle front and on an end of a right side wall 408 facing the vehicle front. Further, the housing fixing hole 490 extends in the vehicle front-rear direction Da.

The member fixing hole 890 is formed on a support portion 800 on the vehicle left side and on the vehicle right side. Further, the member fixing hole 890 is formed at a position corresponding to the housing fixing hole 490. Therefore, the member fixing hole 890 communicates with the housing fixing hole 490.

Therefore, since the housing fixing hole 490 and the member fixing hole 890 are formed on the vehicle left side and on the vehicle right side, the fixing member 90 is positioned on the vehicle left side and on the vehicle right side. Further, the fixing member 90 is inserted into the housing fixing hole 490 and the member fixing hole 890. In such manner, the support portion 800 is connected to a mechanism opening portion 418 and a housing 40 is fixed to a support member 80. Further, since the support portion 800 and the mechanism opening portion 418 are connected, the support portion 800 closes a mechanism opening space 420. Further, a second elastic member 72 supported by the support portion 800 is inserted into the housing space 412 and the mechanism opening space 420. In such manner, a reaction force generating mechanism 60 is housed in the housing space 412 and is surrounded by the support member 80 and the housing 40.

A pedal device 1 of the fifteenth embodiment is configured as described above. The fifteenth embodiment also provides the same effects as the fourteenth embodiment.

Sixteenth Embodiment

Figure 28:
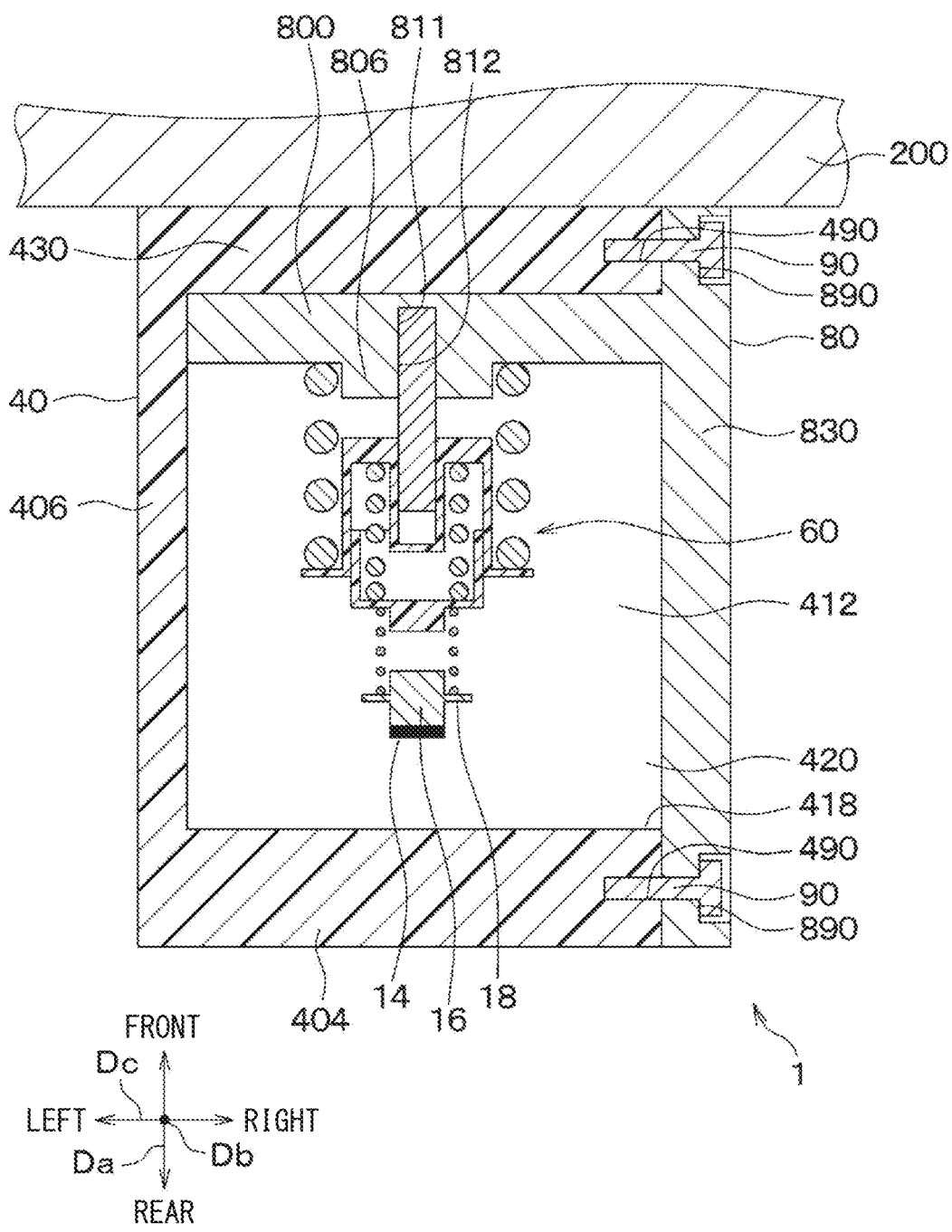
FIG. 28 is a cross-sectional view of a pedal device according to a sixteenth embodiment.

In the sixteenth embodiment, as shown in FIG. 28, the housing 40 includes a front wall 430 instead of a right side wall 408. Further, the shapes of a housing space 412, a pedal opening 414, a mechanism opening portion 418 and a mechanism opening space 420 are different from those in the fourteenth embodiment. Further, a support member 80 includes a support member extension 830. Further, the positions of the housing fixing hole 490, the member fixing hole 890 and the fixing member 90 are different from those in the fourteenth embodiment. Other than the above, the same configuration is adopted as the fourteenth embodiment.

The front wall 430 is connected to a part of a lever supporter 402 facing the vehicle front, a part of a left side wall 406 facing the vehicle front, and a part of a bottom wall 410 facing the vehicle front. It should be noted that a panel hole 802 is formed on the front wall 430, and the front wall 430 is positioned further forward of a support portion 800 in the vehicle. Therefore, the support portion 800 does not have the panel hole 802 formed thereon. Further, a panel bolt 804 is inserted into the panel hole 802 on the front wall 430 and a hole on a dash panel 200. In such manner, the housing 40 is attached to the dash panel 200. A pedal device 1 is thereby attached to the dash panel 200.

The housing space 412 is a space defined by the lever supporter 402, a rear wall 404, the left side wall 406, the bottom wall 410 and the front wall 430.

The pedal opening 414 is defined by an end of the rear wall 404 on the vehicle lower side, an end of the left side wall 406 on the vehicle lower side, and an end of the bottom wall 410 on the vehicle rear side.

The mechanism opening portion 418 is formed by an end of the lever supporter 402 on the vehicle right side, an end of the rear wall 404 on the vehicle right side, an end of the bottom wall 410 on the vehicle right side, and an end of the front wall 430 on the vehicle right side. Therefore, the mechanism opening portion 418 opens and faces in the vehicle right direction. Here, the vehicle right direction corresponds to one direction.

The mechanism opening space 420 is formed by the mechanism opening portion 418 and communicates with the housing space 412 in the vehicle left-right direction Dc.

The support member extension 830 is connected to a part of the support portion 800 on the vehicle right side. The support member extension 830 is made of metal and has a plate shape extending in the vehicle front-rear direction Da and in the vehicle up-down direction Db.

The housing fixing hole 490 is formed on an end of the front wall 430 on the vehicle right side and on an end of the rear wall 404 on the vehicle right side. Further, the housing fixing hole 490 extends in the vehicle left-right direction Dc.

The member fixing hole 890 is formed on the support member extension 830 at portions on the vehicle front side and on the vehicle rear side. Further, the member fixing hole 890 is formed at a position corresponding to the housing fixing hole 490. Therefore, the member fixing hole 890 communicates with the housing fixing hole 490.

Therefore, since housing fixing hole 490 and member fixing hole 890 are formed on the vehicle front side and the vehicle rear side, the fixing member 90 is positioned on the vehicle front side and the vehicle rear side. Further, the fixing member 90 is inserted into the housing fixing hole 490 and the member fixing hole 890. In such manner, the support member extension 830 is connected to the mechanism opening portion 418 and the housing 40 and the support member 80 are fixed together. Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the sixteenth embodiment is configured as described above. The sixteenth embodiment also provides the same effects as the fourteenth embodiment. In the sixteenth embodiment, the housing 40 may have the right side wall 408 instead of the left side wall 406. In such case, for example, the housing space 412 is a space defined by the lever supporter 402, the rear wall 404, the right side wall 408, the bottom wall 410 and the front wall 430. Further, the mechanism opening portion 418 is formed by an end of the lever supporter 402 on the vehicle left side, an end of the rear wall 404 on the vehicle left side, an end of the bottom wall 410 on the vehicle left side, and an end of the front wall 430 on the vehicle left side. At this time, the mechanism opening portion 418 opens and faces in the vehicle left direction. The vehicle left direction corresponds to one direction. Further, the support member extension 830 is connected to a part of the support portion 800 on the vehicle left side. Further, the housing fixing hole 490 is formed on an end of the front wall 430 on the vehicle left side and on an end of the rear wall 404 on the vehicle left side. Such a form is also acceptable.

Seventeenth Embodiment

Figure 29:
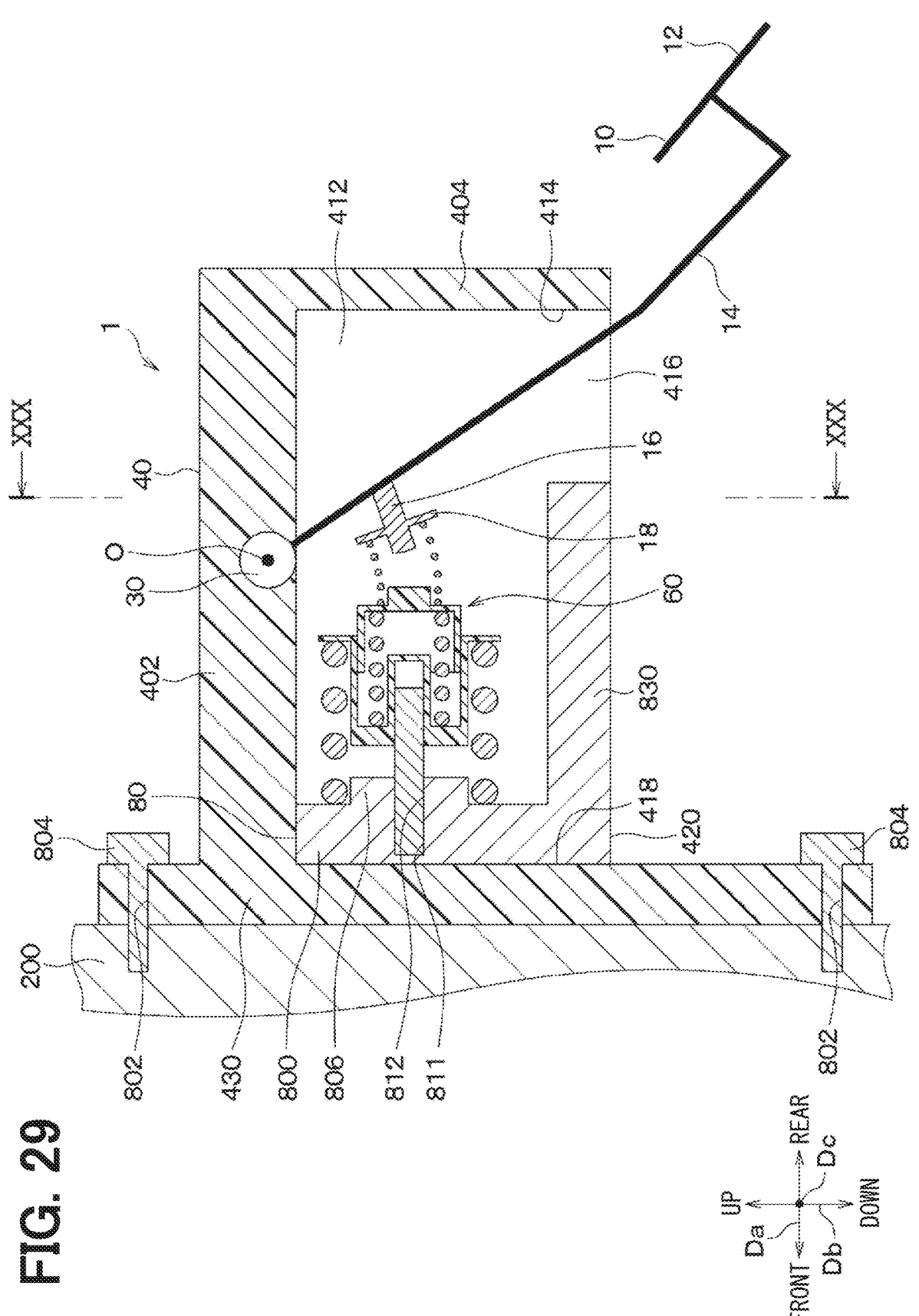
FIG. 29 is a cross-sectional view of a pedal device according to a seventeenth embodiment.
Figure 30:
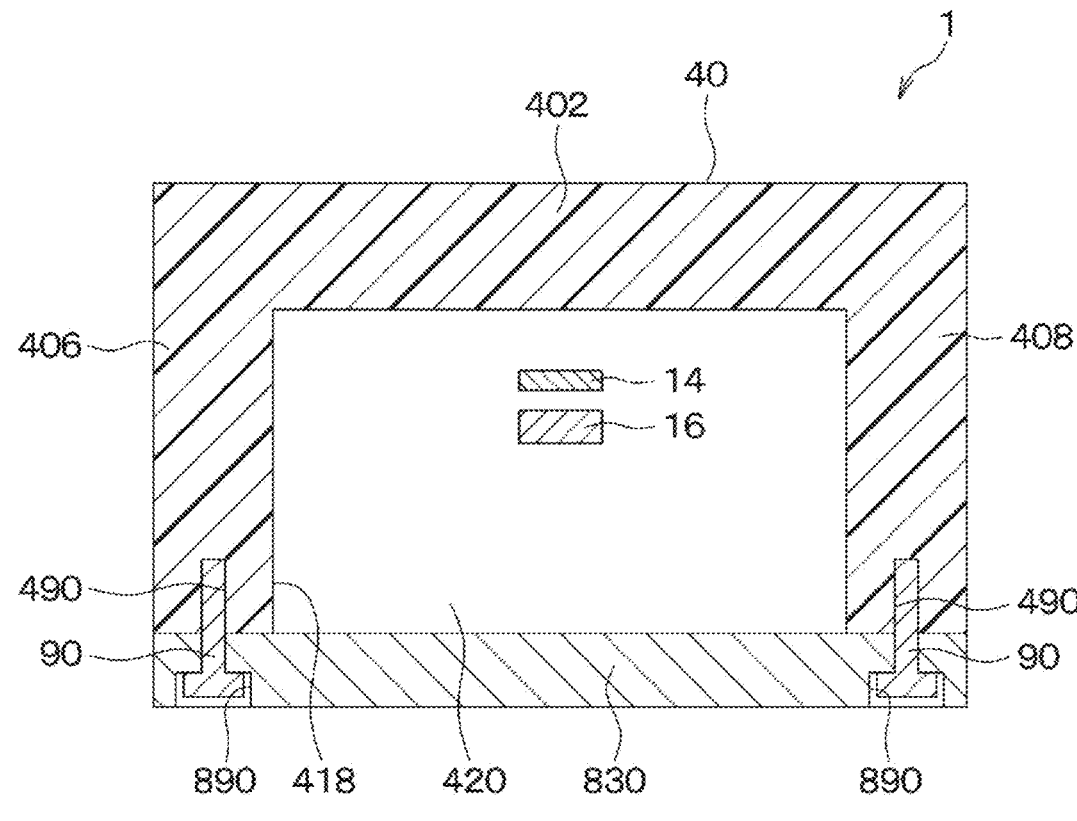
FIG. 30 is a cross-sectional view taken along a line XXX-XXX in FIG. 29.
Figure 30:
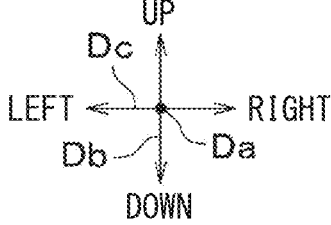

In the seventeenth embodiment, as shown in FIGS. 29 and 30, a housing 40 includes a front wall 430 instead of a bottom wall 410. Also, instead of a support member 80 not having a panel hole 802 and a panel bolt 804, the housing 40 includes the panel hole 802 and the panel bolt 804. Further, the shapes of a housing space 412, a pedal opening 414, a mechanism opening portion 418 and a mechanism opening space 420 are different from those in the fourteenth embodiment. Further, the support member 80 includes a support member extension 830. Further, the positions of a housing fixing hole 490, a member fixing hole 890 and a fixing member 90 are different from those in the fourteenth embodiment. Other than the above, the same configuration is adopted as the fourteenth embodiment.

The front wall 430 is connected to a part of a lever supporter 402 facing the vehicle front, a part of a left side wall 406 facing the vehicle front, and a part of a right side wall 408 facing the vehicle front. Further, the panel hole 802 is formed on the front wall 430. The panel bolt 804 is inserted into the panel hole 802 and a hole on a dash panel 200. In such manner, the housing 40 is attached to the dash panel 200. A pedal device 1 is thereby attached to the dash panel 200.

The housing space 412 is a space defined by the lever supporter 402, a rear wall 404, the left side wall 406, the right side wall 408 and the front wall 430.

The pedal opening 414 is defined by an end of the rear wall 404 on the vehicle lower side, an end of the left side wall 406 on the vehicle lower side, and an end of the right side wall 408 on the vehicle lower side.

The mechanism opening portion 418 is defined by an end of the left side wall 406 on the vehicle lower side, an end of the right side wall 408 on the vehicle lower side, and a part of the front wall 430 on the vehicle lower side. Therefore, the mechanism opening portion 418 opens and faces in the vehicle downward direction. The vehicle downward direction corresponds to one direction.

The mechanism opening space 420 is formed by the mechanism opening portion 418 and communicates with the housing space 412 in the vehicle up-down direction Db.

The support member extension 830 is connected to a part of a support portion 800 on the vehicle lower side. The support member extension 830 is made of metal and has a plate shape extending in the vehicle front-rear direction Da and in the vehicle left-right direction Dc.

The housing fixing hole 490 is formed on an end of the left side wall 406 on the vehicle lower side and on an end of the right side wall 408 on the vehicle lower side. Further, the housing fixing hole 490 extends in the vehicle up-down direction Db.

The member fixing hole 890 is formed on the support member extension 830 at portions on the vehicle left side and on the vehicle right side. Further, the member fixing hole 890 is formed at a position corresponding to the housing fixing hole 490. Therefore, the member fixing hole 890 communicates with the housing fixing hole 490.

Therefore, since the housing fixing hole 490 and the member fixing hole 890 are formed at positions (i) on the vehicle lower side and on vehicle left side and (ii) on the vehicle lower side and vehicle right side, the fixing member 90 is positioned (i) on the vehicle lower side and on vehicle left side and (ii) on the vehicle lower side and vehicle right side. Further, the fixing member 90 is inserted into the housing fixing hole 490 and the member fixing hole 890. In such manner, the support member extension 830 is connected to the mechanism opening portion 418 and the housing 40 and the support member 80 are fixed together. Further, since the support member extension 830 and the mechanism opening portion 418 are connected, the support member extension 830 closes the mechanism opening space 420. Further, a second elastic member 72 supported by the support portion 800 is inserted into the housing space 412. In such manner, a reaction force generating mechanism 60 is housed in the housing space 412 and is surrounded by the support member 80 and the housing 40.

The pedal device 1 of the seventeenth embodiment is configured as described above. The seventeenth embodiment also provides the same effects as the fourteenth embodiment.

Eighteenth Embodiment

Figure 31:
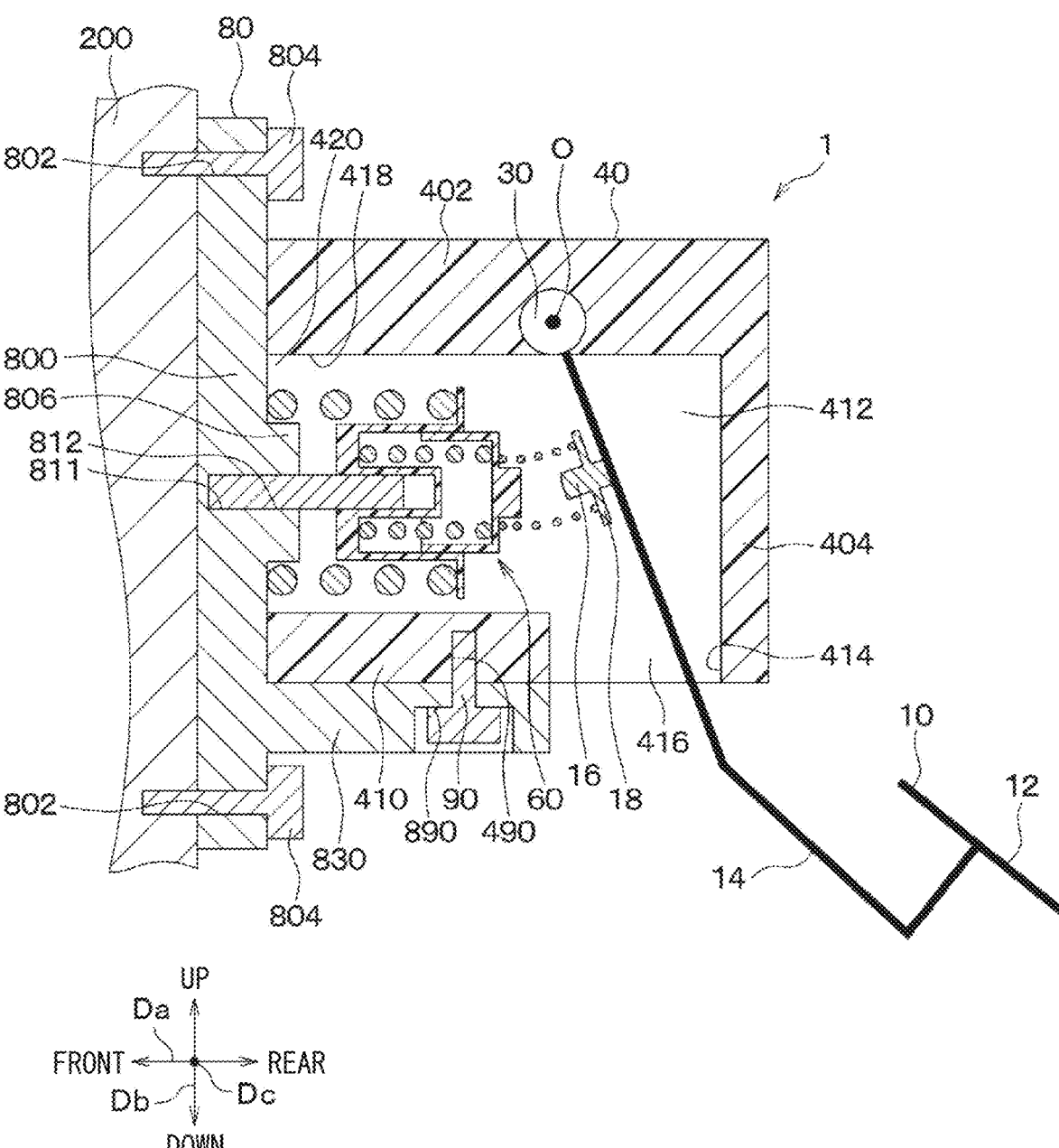
FIG. 31 is a cross-sectional view of a pedal device according to an eighteenth embodiment.

In the eighteenth embodiment, as shown in FIG. 31, a support member 80 includes a support member extension 830. Further, the positions of a housing fixing hole 490, a member fixing hole 890 and a fixing member 90 are different from those in the fourteenth embodiment. Other than the above, the same configuration is adopted as the fourteenth embodiment.

The support member extension 830 is connected to a part of a support portion 800 on the vehicle lower side. The support member extension 830 is formed of metal in a plate shape extending in the vehicle rear direction from a part of the support portion 800 on the vehicle lower side. Further, the support member extension 830 is positioned on the vehicle lower side than a bottom wall 410 and is in contact with the bottom wall 410. Further, the support member extension 830 may be positioned at the vehicle upper side than the bottom wall 410.

The housing fixing hole 490 is formed on the bottom wall 410. Further, the housing fixing hole 490 extends in the vehicle up-down direction Db. The member fixing hole 890 is formed on the support member extension 830 and are formed at positions corresponding to the housing fixing holes 490. Therefore, the member fixing hole 890 communicates with the housing fixing hole 490. Therefore, since the housing fixing hole 490 and the member fixing hole 890 are formed on the vehicle lower side, the fixing member 90 is positioned on the vehicle lower side. Further, the fixing member 90 is inserted into the housing fixing hole 490 and the member fixing hole 890. In such manner, the support member extension 830 is connected to the bottom wall 410 and the housing 40 and the support member 80 are fixed together. Further, the support portion 800 closes the mechanism opening space 420. Further, a second elastic member 72 supported by the support portion 800 is inserted into the housing space 412 and the mechanism opening space 420. In such manner, a reaction force generating mechanism 60 is housed in the housing space 412 and is surrounded by the support member 80 and the housing 40.

A pedal device 1 of the eighteenth embodiment is configured as described above. The eighteenth embodiment also provides the same effects as the fourteenth embodiment. In the eighteenth embodiment, the support member extension 830 may extend in the vehicle rear direction from a part of the support portion 800 on the vehicle upper side. In such case, the support member extension 830 is in contact with a lever supporter 402. Further, the housing fixing hole 490 is formed on the lever supporter 402. Such a form is also acceptable.

Further, the support member extension 830 may extend in the vehicle rear direction from a part of the support portion 800 on the vehicle left side. In such case, the support member extension 830 is in contact with the left side wall 406. Further, the housing fixing hole 490 is formed on the left side wall 406. Such a form is also acceptable.

Further, the support member extension 830 may extend in the vehicle rear direction from a part of the support portion 800 on the vehicle right side. In such case, the support member extension 830 is in contact with the right side wall 408. Further, the housing fixing hole 490 is formed on the right side wall 408. Such a form is also acceptable.

Other Embodiments

The present disclosure is not limited to the above-described embodiments, and appropriate modifications can be made to the above-described embodiments. Further, in each of the above embodiments, it is understood that the elements constituting the embodiment are not necessarily essential, except in cases where it is specifically stated that they are essential or where they are clearly considered to be essential in principle.

In each of the above embodiments, the pedal device 1 is used as a brake pedal in the brake-by-wire system 150 that controls the brakes of the vehicle 6. In contrast, a pedal device 1 is not limited to being used as a brake pedal. The pedal device 1 may be used, for example, as an accelerator pedal for accelerating the vehicle 6.

In each of the above-described embodiments, the reaction force is generated as the restoring force generated by compressing the first elastic member 71, the second elastic member 72, and the third elastic member 73. However, the present invention is not limited to such configuration. For example, the position of the reaction force generating mechanism 60 may be changed so that a reaction force is generated by a restoring force generated when the first elastic member 71, the second elastic member 72, and the third elastic member 73 are pulled. Further, while the coil springs of the first elastic member 71, the second elastic member 72 and the third elastic member 73 are equally spaced coil springs, they are not limited to such configuration, i.e., they may be conical coil springs, unequal spaced coil springs or the like.

In each of the above embodiments, the pedal device 1 is a suspended-type device, but is not limited to such configuration and may be an organ-type device. In case of the organ-type device, a part of the pedal 10 that is further forward of the rotation shaft O rotates toward the dash panel 200 in response to an increase in the driver's pedaling force applied to the pedal 10.

In each of the above embodiments, in the brake-by-wire system 150, the master cylinder 126 generates hydraulic pressure in the brake fluid flowing through the brake circuit 120. However, the configuration is not limited to the above, in which the master cylinder 126 generates hydraulic pressure in the brake fluid flowing through the brake circuit 120. For example, hydraulic pressure may be generated in the brake fluid flowing through the brake circuit 120 by a hydraulic pump.

The above embodiments may be combined as appropriate.

(Viewpoints of the Present Disclosure)

<Viewpoint 1>

A pedal device includes: a pedal (10) rotating about a rotation shaft (O) when being stepped on by an operator; an elastic member (60, 72) configured to be deformed by a force from the pedal when the pedal rotates, and to generate a reaction force against a pedaling force of the operator; a housing (40) defining a housing space (412) that houses the elastic member, and provided to rotatably support the pedal; and a support member (80) configured to support the elastic member. The housing (40) includes an opening portion (418) that defines an opening space (420) opening in one direction, the opening space (420) of the housing communicates with the housing space, and the support member (80) and the housing (40) are connected to each other to surround the elastic member while the opening space (420) of the housing is closed by the support member. With this, the elastic member is arranged in the housing space.

<Viewpoint 2>

In the pedal device according to viewpoint 1, the elastic member is a coil spring.

<Viewpoint 3>

In the pedal device according to viewpoint 1 or 2, the housing is disposed on a side of a vehicle compartment of a vehicle (6) with respect to a partition wall (200) that separates a vehicle outside (7) of the vehicle compartment and an inside (8) of the vehicle compartment, and the one direction is a direction from the housing to the partition wall.

<Viewpoint 4>

In the pedal device according to viewpoint 1 or 2, the housing includes an extension (422, 426) extending in the one direction from the opening portion (418), and a claw (424, 428) connected to the extension and extending from the extension in a direction intersecting the one direction in which the extension extends. The support member (80) includes a member space (821, 822) into which the extension is inserted, and the housing engages with the support member by the claw that is in contact with the support member.

<Viewpoint 5>

In the pedal device according to viewpoint 4, the extension is deformed when the claw is inserted into the member space.

<Viewpoint 6>

In the pedal device according to viewpoint 5, the extension of the housing is a first extension (422), the claw of the housing is a first claw (424). In this case, the housing further includes a second extension (426) extending in the one direction from the opening, and a second claw (428) connected to the second extension and rotating about an axial extending in a direction perpendicular to the one direction. In addition, the housing rotates about the axial of the second claw in response to rotation of the second claw, to insert the first claw into the member space.

<Viewpoint 7>

In the pedal device according to any one of viewpoints 1 to 3, the support member further includes a support portion (800) that supports the elastic member, an extension (841, 842) that extends from the support portion in an extending direction opposite to the one direction, and a claw (851, 852) that is connected to the extension and extends from the extension in a direction intersecting the extending direction in which the extension extends. In addition, the housing includes a first space (431, 433) into which the extension of the support member is inserted, and a second space (432, 434) that communicates with the first space and into which the claw is inserted. Furthermore, the housing is engaged with the support member by the claw that is in contact with the housing.

<Viewpoint 8>

In the pedal device according to viewpoint 7, the extension of the support member is deformed when the claw is inserted into the first space.

<Viewpoint 9>

In the pedal device according to viewpoint 8, the extension of the support member is a first extension (841), and the claw of the support member is a first claw (851). The support member further includes a second extension (842) extending from the support portion (800) in an extending direction opposite to the one direction, and a second claw (852) connected to the second extension and rotating about an axis extending in a direction perpendicular to the one direction. The support member rotates about the axis of the second claw in accordance with rotation of the second claw, to insert the first claw into the first space.

<Viewpoint 10>

In the pedal device according to any one of viewpoints 1 to 3, the housing further includes a housing fixing hole (490), and the support member further includes a member fixing hole (890) communicating with the housing fixing hole. In this case, the pedal device further includes a fixing member (90) that is inserted into the housing fixing hole and the member fixing hole to fix the housing and the support member.

<Viewpoint 11>

In the pedal device according to viewpoint 10, the housing fixing hole is provided in the opening portion (418).

<Viewpoint 12>

In the pedal device according to any one of viewpoints 1 to 6, 10 and 11, the support member includes a support portion (800) that supports the elastic member, and a regulating portion (806) that extends from the support portion in a deformation direction of the elastic member. In addition, the regulating portion is configured to regulate a movement of the elastic member in a direction perpendicular to the deformation direction of the elastic member.

<Viewpoint 13>

In the pedal device according to any one of viewpoints 1 to 6 and 10 to 12, the support member supports one end of the elastic member. In this case, the pedal device further includes a holder (62) that includes a member support portion (626) that supports an other end of the elastic member, and a member regulating portion (622) that extends from the member support portion in a deformation direction of the elastic member. In addition, the member regulating portion is configured to regulate a movement of the elastic member in a direction perpendicular to the deformation direction of the elastic member.

What is claimed is:

1. A pedal device comprising:
   a pedal rotating about a rotation shaft when being stepped on by an operator;
   an elastic member configured to be deformed by a force from the pedal when the pedal rotates, and to generate a reaction force against a pedaling force of the operator;
   a housing defining a housing space that houses the elastic member, and provided to rotatably support the pedal; and
   a support member configured to support the elastic member, wherein the housing includes an opening portion that defines an opening space opening in one direction,
   the opening space of the housing communicates with the housing space, the support member and the housing are connected to each other to surround the elastic member while the opening space of the housing is closed by the support member, and the elastic member is arranged in the housing space, the housing includes an extension extending in the one direction from the opening portion, and a claw connected to the extension and extending from the extension in a direction intersecting the one direction in which the extension extends, the support member includes a member space into which the extension is inserted, and the housing engages with the support member by the claw that is in contact with the support member.

2. The pedal device according to claim 1, wherein the elastic member is a coil spring.

3. The pedal device according to claim 1, wherein the housing is disposed on a side of a vehicle compartment of a vehicle with respect to a partition wall that separates a vehicle outside of the vehicle compartment and an inside of the vehicle compartment, and the one direction is a direction from the housing to the partition wall.

4. The pedal device according to claim 1, wherein the extension is deformed when the claw is inserted into the member space.

5. The pedal device according to claim 4, wherein the extension is a first extension, the claw is a first claw, the housing further includes a second extension extending in the one direction from the opening portion, and a second claw connected to the second extension and rotating about an axial extending in a direction perpendicular to the one direction, and the housing rotates about the axial of the second claw in response to rotation of the second claw, to insert the first claw into the member space.

6. The pedal device according to claim 1, wherein the support member includes a support portion that supports the elastic member, and a regulating portion that extends from the support portion in a deformation direction of the elastic member, and the regulating portion is configured to regulate a movement of the elastic member in a direction perpendicular to the deformation direction of the elastic member.

7. The pedal device according to claim 1, wherein the support member supports one end of the elastic member, the pedal device further comprising a holder that includes a member support portion that supports an other end of the elastic member, and a member regulating portion that extends from the member support portion in a deformation direction of the elastic member, and the member regulating portion is configured to regulate a movement of the elastic member in a direction perpendicular to the deformation direction of the elastic member.

8. A pedal device comprising:

a pedal rotating about a rotation shaft when being stepped on by an operator;

an elastic member configured to be deformed by a force from the pedal when the pedal rotates, and to generate a reaction force against a pedaling force of the operator;

a housing defining a housing space that houses the elastic member, and provided to rotatably support the pedal; and a support member configured to support the elastic member, wherein the housing includes an opening portion that defines an opening space opening in one direction, the opening space of the housing communicates with the housing space, the support member and the housing are connected to each other to surround the elastic member while the opening space of the housing is closed by the support member, the elastic member is arranged in the housing space, the support member further includes a support portion that supports the elastic member, an extension that extends from the support portion in an extending direction opposite to the one direction, and a claw that is connected to the extension and extends from the extension in a direction intersecting the extending direction in which the extension extends, the housing includes a first space into which the extension of the support member is inserted, and a second space that communicates with the first space and into which the claw is inserted, and the housing is engaged with the support member by the claw that is in contact with the housing.

9. The pedal device according to claim 8, wherein the extension of the support member is deformed when the claw is inserted into the first space.

10. The pedal device according to claim 9, wherein the extension of the support member is a first extension, the claw of the support member is a first claw, the support member further includes a second extension extending from the support portion in an extending direction opposite to the one direction, and a second claw connected to the second extension and rotating about an axis extending in a direction perpendicular to the one direction, and the support member rotates about the axis of the second claw in accordance with rotation of the second claw, to insert the first claw into the first space.

11. A pedal device comprising:

a pedal rotating about a rotation shaft when being stepped on by an operator;

an elastic member configured to be deformed by a force from the pedal when the pedal rotates, and to generate a reaction force against a pedaling force of the operator;

a housing defining a housing space that houses the elastic member, and provided to rotatably support the pedal; and a support member configured to support the elastic member, wherein the housing includes an opening portion that defines an opening space opening in one direction, the opening space of the housing communicates with the housing space, the support member and the housing are connected to each other to surround the elastic member while the opening space of the housing is closed by the support member, the elastic member is arranged in the housing space, the housing further includes a housing fixing hole, and the support member further includes a member fixing hole communicating with the housing fixing hole, the pedal device further comprising a fixing member that is inserted into the housing fixing hole and the member fixing hole to fix the housing and the support member.

12. The pedal device according to claim 11, wherein the housing fixing hole is provided in the opening portion.

13. The pedal device according to claim 11, wherein the support member includes a support portion that supports the elastic member, and a regulating portion that extends from the support portion in a deformation direction of the elastic member, and the regulating portion is configured to regulate a movement of the elastic member in a direction perpendicular to the deformation direction of the elastic member.

14. The pedal device according to claim 11, wherein the support member supports one end of the elastic member, the pedal device further comprising:

a holder that includes a member support portion that supports an other end of the elastic member, and a member regulating portion that extends from the member support portion in a deformation direction of the elastic member, and the member regulating portion is configured to regulate a movement of the elastic member in a direction perpendicular to the deformation direction of the elastic member.

* * * * *